United States Patent

Nakamoto et al.

[11] Patent Number: 5,969,896
[45] Date of Patent: Oct. 19, 1999

[54] MAGNETIC RECORDING/REPRODUCING DEVICE WITH A FUNCTION OF CORRECTING WAVEFORM OF MAGNETORESISTIVE-EFFECT HEAD

[75] Inventors: Kazuhiro Nakamoto; Yoshiaki Kawato; Hiroshi Fukui; Hiroyuki Hoshiya, all of Hitachi, Japan

[73] Assignee: Hitachi, Ltd., Tokyo, Japan

[21] Appl. No.: 08/778,761

[22] Filed: Jan. 6, 1997

[30] Foreign Application Priority Data

| Jan. 8, 1996 | [JP] | Japan | 8-000487 |
| May 30, 1996 | [JP] | Japan | 8-136113 |

[51] Int. Cl.$^6$ ............................................ G11B 5/03
[52] U.S. Cl. ............................................ 360/66
[58] Field of Search ........................... 360/66, 31, 113, 360/75, 53

[56] References Cited

U.S. PATENT DOCUMENTS

| 5,206,590 | 4/1993 | Dieny | 360/113 |
| 5,412,518 | 5/1995 | Christner | 360/66 |
| 5,615,063 | 3/1997 | Kuroki et al. | 360/66 |
| 5,650,887 | 7/1997 | Dovek | 360/113 |
| 5,719,719 | 2/1998 | Tsuyoshi | 360/66 |

FOREIGN PATENT DOCUMENTS

| 4-358310 | 12/1992 | Japan . |
| 7-201005 | 8/1995 | Japan . |
| 8-7203 | 1/1996 | Japan . |

OTHER PUBLICATIONS

Abstract of Japanese Patent No. 408306011A to Toshiba Corp., Nov. 22, 1996.
Abstract of Japanese Patent No. 407220208A to Fujitsu, Aug. 18, 1995.
Meeting of the Magnetic Society of Japan, vol. 24, A–10, Dec. 1995, Nakamoto et al.

*Primary Examiner*—Alan Faber
*Attorney, Agent, or Firm*—Fay, Sharpe, Beall, Fagan, Minnich & McKee

[57] ABSTRACT

A magnetic recording/reproducing device has an inductive write element provided with a coil and magnetic cores for recording information on a medium, a magnetoresistive read element for transducing a change in a magnetic field leaking from a medium, on which information is recorded, into an electrical signal, a detector for detecting an output signal of the read element, a bias field applying unit for applying a bias field to the read element, and a recording/reproducing operation controller for reproducing information based on an output signal from the read element and for controlling the recording current applying unit based on an inputted signal to record information. The recording/reproducing operation control unit has a stabilizing unit for controlling the bias field applying unit to make an absolute value of the bias field in a state where a magnetic field leaking from the medium is applied to the read element larger than that during a normal reproducing operation.

36 Claims, 12 Drawing Sheets

BIAS CURRENT = +10 mA

BIAS CURRENT = +10 mA

BIAS CURRENT = +20 mA

BIAS CURRENT = +10 mA

BIAS CURRENT = -20 mA

BIAS CURRENT = +10 mA

SUFFICIENTLY FIXED

NOT SUFFICIENTLY FIXED

SUFFICIENTLY FIXED AFTER POSITIVE MAXIMUM MAGNETIC FIELD IS APPLIED

SUFFICIENTLY FIXED AFTER NEGATIVE MAXIMUM MAGNETIC FIELD IS APPLIED

NOT SUFFICIENTLY FIXED AFTER POSITIVE MAXIMUM MAGNETIC FIELD IS APPLIED

NOT SUFFICIENTLY FIXED AFTER NEGATIVE MAXIMUM MAGNETIC FIELD IS APPLIED

MAGNETIC RECORDING/REPRODUCING DEVICE WITH A FUNCTION OF CORRECTING WAVEFORM OF MAGNETORESISTIVE-EFFECT HEAD

BACKGROUND OF THE INVENTION

The present invention relates to a magnetic recording/reproducing device equipped with an anisotropic magnetoresistive read head or a giant magnetoresistive read head, and more particularly to a device for suppressing errors due to fluctuations in read waveform during reproduction.

A magnetic recording/reproducing device generally comprises a medium for magnetically recording information, a write element for recording information on the medium, a read element for transducing changes in a magnetic field leaking from the medium into electrical signals, means for detecting output signals of the read element, means for controlling recording/reproducing operations, and positioning means for positioning the write and read elements relative to the medium. Known media include disk-like ones and tape-like ones, and disk-like media are classified into a type previously incorporated in a device and a replaceable type.

The write element and the read element are often integrally formed into a laminate so as to be used as a read/write composite head. In a magnetic disk device, which is a form of magnetic recording/reproducing device, a single or a plurality of read/write heads are moved above a desired track or tracks on a single or a plurality of disks to record information on the disk(s) or to reproduce information from the disk(s). As a positioning mechanism for the read/write heads, a rotary actuator using a voice coil motor is widely employed. The rotary actuator is a mechanism which has a rotating shaft outside the disks and rotates read/write heads mounted at the tip thereof above the disks to move the heads to desired positions.

For a write element, in turn, an inductive element having a coil for generating flux and a pair of magnetic cores for collecting the flux is mainly employed. The inductive write element performs a recording operation by passing a pulse-like recording current through the coil to apply a medium with a magnetic field generated by the write element. Employed for a read element is a magnetoresistive (MR) element which has a magnetoresistive layer and a pair of leads electrically bonded to the MR layer. The MR element may be generally classified into an anisotropic magnetoresistive (AMR) element applying the conventionally known AMR effect and a giant magnetoresistive (GMR) element applying a GMR effect. One type of GMR element is a spin valve head which is disclosed, for example, in JP-A-4-358310, which corresponds to U.S. Pat. No. 5,206,590. While no head employing a GMR element has been manufactured at present, studies on the GMR element have been advanced as an element of the next and subsequent generations because of its higher sensitivity than a head employing an AMR element.

As is well known in the art, the AMR element has an anisotropic magnetoresistive (AMR) layer which changes its electrical resistance by the action of a magnetic field, wherein a change in voltage is derived as an output signal when a constant current is applied to the AMR layer, while a change in current is derived as an output signal when a constant voltage is applied to the same. Although the AMR layer changes its electrical resistance, a resistance of the MR film is not in a proportional relationship with the applied field. Thus, for improving the linearity of the relationship between the applied magnetic field and an output signal of the AMR element, the AMR element often has a structure including a soft adjacent layer (SAL) or an electrically conductive bias layer laminated near the AMR layer. The SAL is magnetized by receiving a magnetic field generated by a bias current flowing through the AMR layer, and has a function of applying the AMR layer with a magnetic field generated by the magnetization as a bias field. The electrically conductive bias layer generates a magnetic field when applied with a bias current flowing therethrough, and has a function of applying the AMR layer with this magnetic field as a bias field. In either of the structures, a bias current is passed through the AMR element to apply the AMR layer with a bias field such that the AMR element can utilize a highly linear portion of the AMR layer characteristic.

The GMR element, on the other hand, has laminated GMR layers composed of a first ferromagnetic layer which changes a magnetization direction due to a magnetic field leaking from a medium, a second ferromagnetic layer having a fixed magnetization direction, and a non-magnetic conductor layer inserted between the first ferromagnetic layer and the second ferromagnetic layer. The GMR element changes its electrical resistance in response to a change in the angle between the magnetization direction of the first ferromagnetic layer and the magnetization direction of the second ferromagnetic layer. The second ferromagnetic layer is often laminated on/under an antiferromagnetic layer or a permanent magnet layer for fixing the magnetization thereof. The GMR element typically exhibits the best linearity when the magnetization direction of the first ferromagnetic layer is orthogonal to the magnetization direction of the second ferromagnetic layer. As is the case of the AMR element, a reproduced signal from the GMR element is detected by applying a constant current or a constant voltage current to the element, In this event, a portion of the detecting current flows through the non-magnetic conductor layer, the second ferromagnetic layer, and the antiferromagnetic layer or the permanent magnet layer for fixing the magnetization direction of the second ferromagnetic layer to generate a magnetic field which is applied to the first ferromagnetic layer as a bias field. Thus, the bias field causes the first ferromagnetic layer to change the magnetization direction. As described above, while the AMR element and the GMR element operate according to different principles, they have a common basis in that a bias current (which in many cases serves as a detecting current) flowing through the MR layer during a reproducing operation generates a bias field which is applied to the MR layer to rotate the magnetization of the MR layer.

In addition, the respective magnetic layers of the respective MR elements, particularly, the AMR layer and the SAL constituting the AMR element and the first ferromagnetic layer constituting the GMR element are desirably held in a single domain state in order to suppress magnetic noise and ensure the linearity between an applied magnetic field and an output signal. As known techniques for realizing this state, there is an approach which employs a domain control layer comprising a permanent magnet or laminated layers composed of a soft magnetic layer and an antiferromagnetic layer arranged at both end portions of each MR element in a track direction such that a magnetic field generated by the domain control layer is utilized to induce the single domain state. Also known is an approach in which an antiferromagnetic layer is directly laminated on both end regions of an AMR layer of an AMR element or of a first ferromagnetic layer of a GMR element to hold these regions in a single domain to induce a detecting portion positioned in a central region of the AMR layer or the first ferromagnetic layer (a region sandwiched by a pair of leads for transducing a change in magnetic field into an electrical signal) into a single domain state.

SUMMARY OF THE INVENTION

It is an object of the present invention to provide a magnetic recording/reproducing device having a self-correcting function which is capable of returning a waveform of an MR element to an original normal state even if fluctuations in read waveform cause errors during a reproducing operation.

It is another object of the present invention to provide a magnetic recording/reproducing device which comprises the self-correcting function to reduce errors.

In a conventional magnetic recording/reproducing device equipped with a read/write head including an inductive element for recording and an MR element for reproducing, an outputted waveform may include a large drop, a large change in shape, and so on before and after a recording operation (such abnormalities in waveform are hereinafter referred to as "fluctuations in read waveform"), which may cause the magnetic recording/reproducing device to fall into a trouble during a reproducing operation. Generally, in such an event, the reproducing operation is repeated several times within a predetermined limit with a hope that the device recovers a correct operation. However, even with a number of repetitive reproducing operations, the device occasionally continues errors and cannot be corrected.

Since the fluctuations in read waveform occur before and after a recording operation, it can be predicted that a magnetic field generated by the write element must act on the MR element. Generally, an MR layer in an MR element is held in a single domain state for suppressing its magnetic noise. It has been found however that in an MR element in which fluctuations in read waveform are present, the MR layer does not remain in the single domain state. It can be thought that a magnetic field generated by the write element causes the single domain state of the MR layer to break.

To achieve the above objects, a magnetic recording/reproducing device of the present invention has an inductive write element having a coil for generating flux and a pair of magnetic cores for collecting the flux for magnetically recording information on a medium, a magnetoresistive read element having a magnetoresistive layer and a pair of leads electrically bonded to the magnetoresistive layer for transducing a change in a magnetic field leaking from a medium, on which information is recorded, into an electrical signal, means for applying a recording current to the coil of the write element, means for detecting an output signal of the read element, means for applying a bias field to the read element, and recording/reproducing operation control means for reproducing information based on an output signal from the read element and for controlling the means for applying a recording current based on an inputted signal to record information, wherein the recording/reproducing operation control means includes stabilizing means for controlling the bias field applying means to make an absolute value of the bias field in a state where the read element is applied with a magnetic field leaking from the medium larger than during a normal reproducing operation.

Within magnetic recording/reproducing devices having the stabilizing means for the magnetoresistive read element, one having means for applying a bias current to the read element to apply a bias field to the same may include stabilizing means for controlling the bias current applying means so as to make an absolute value of the bias current larger than during a reproducing operation in order to apply a larger bias current.

Also, a magnetic recording/reproducing device having a read/write head having an integral write element and read element may include stabilizing means for controlling the recording current applying means and the bias current applying means, when information is recorded, to apply a recording current to the coil and simultaneously make an absolute value of a bias current of the read element larger than usual.

Further, a magnetic recording/reproducing device having positioning means for determining a relative position of a read/write head with respect to a medium and a head recovering region on the medium different from a region on which information is recorded may include stabilizing means for controlling a recording current applying means and a bias current applying means, when the read/write head remains above the head recovering region, to apply a recording current to a coil and simultaneously make an absolute value of a bias current of a read element larger than usual.

Each of the magnetic recording/reproducing devices may additionally include bias current applying means for enabling the bias current to flow both in the same direction as and in the opposite direction to a direction in which the bias current flows during a normal reproducing operation.

Furthermore, within the respective magnetic recording/reproducing devices, the device having the recording/reproducing operation control means including error determining means may additionally include, in the recording/reproducing operation control means, stabilizing means for controlling to perform a sequence of operations once or a plurality of times, wherein the sequence of operations includes applying a bias current, at the beginning of a stabilizing operation, in the same direction as a direction in which the bias current is applied during a normal reproducing operation and with a larger magnitude than that of the bias current applied during the normal reproducing operation, determining whether or not an error has occurred, and applying a bias current in the direction opposite to that of the bias current when an error is determined as a result of the error determination.

Also, the present invention proposes a magnetic recording/reproducing device including a read element, the magnetoresistive layer of which has a lamination structure comprising a first ferromagnetic layer, the magnetization direction of which changes by the magnetic field leaking from a medium on which information is recorded, a second ferromagnetic layer having a fixed magnetization direction, and a non-magnetic conductor layer inserted between the first ferromagnetic layer and the second ferromagnetic layer, the magnetoresistive layer being a giant magnetoresistive layer which changes its resistance in response to a change in an angle between the magnetization direction of the first ferromagnetic layer and the magnetization direction of the second ferromagnetic layer, wherein a recording/reproducing operation control means includes stabilizing means for controlling recording current applying means to fix the polarity of a recording current applied to a coil of a write element in one direction at the end of a recording operation.

More specifically, the present invention proposes the recording/reproducing operation control means including stabilizing means for controlling the polarity of the recording current applied to the coil of the write element such that a component perpendicular to an air bearing surface of the magnetization direction of the second ferromagnetic layer is in parallel with a component perpendicular to the air bearing surface of a magnetic field generated by the recording current applied to the read element at the end of the recording operation.

A magnetic recording/reproducing device including a read element having a magnetoresistive layer formed of a giant magnetoresistive layer, positioning means for determining a relative position of a read/write head with respect to a medium, and a head recovering region on the medium different from a region on which information is recorded may include stabilizing means for controlling recording current applying means, when the read/write head remains above the head recovering region, to fix the polarity of a recording current applied to a coil of a write element in one direction at the end of a recording operation, by fixedly setting the polarity of the recording current in one direction at the end of applying the recording current when an AC recording current is applied to the coil of the write element, and by fixedly setting the polarity of the recording current in one direction when a DC recording current is applied to the coil of the write element.

More specifically, the magnetic recording/reproducing device may include stabilizing means for controlling the polarity of the recording current applied to the coil of the write element such that a component perpendicular to an air bearing surface of a magnetization direction of a second ferromagnetic layer is in parallel with a component perpendicular to the air bearing surface of a magnetic field generated by a recording current applied to the read element at the end of the recording operation performed when the read/write head remains above the head recovering region, i.e., the two components have the same sign.

A magnetic recording/reproducing device including a read element having a magnetoresistive layer formed of a giant magnetoresistive layer may include stabilizing means for controlling a direction of a bias current such that a magnetic field generated by a portion of the bias current flowing through a first ferromagnetic layer and applied to a second ferromagnetic layer is in the same direction as the magnetization of the second ferromagnetic layer in a state where the read element is applied with a magnetic field leaking from a medium.

A magnetic recording/reproducing device including a read element having a magnetoresistive layer formed of a giant magnetoresistive layer and a read/write head having an integral write element and read element may include stabilizing means for controlling recording current applying means and a bias current applying direction, when information is recorded, such that a magnetic field generated by a portion of a bias current flowing through a first ferromagnetic layer and applied to a second ferromagnetic layer is in the same direction as the magnetization of the second ferromagnetic layer in a state where a recording current is applied to a coil.

The devices configured as described above may further include additional stabilizing means for controlling the polarity of a recording current applied to the coil of the write element such that a component perpendicular to an air bearing surface of the magnetization direction of the second ferromagnetic layer is in parallel with a component perpendicular to the air bearing surface of a magnetic field generated by the recording current applied to the read element at the end of the recording operation, i.e., the two components have the same sign.

Furthermore, a magnetic recording/reproducing device including a read element having a magnetoresistive layer formed of a giant magnetoresistive layer, positioning means for determining a relative position of a read/write head with respect to a medium, and a head recovering region on the medium different from a region on which information is recorded may include stabilizing means for controlling recording current applying means and a bias current applying direction, when the read/write head remains above the head recovering region, such that a magnetic field generated by a portion of a bias current flowing through a first ferromagnetic layer and applied to a second ferromagnetic layer is in the same direction as the magnetization of the second ferromagnetic layer in a state where a recording current is applied to the coil.

The device configured as described above may further include additional stabilizing means for controlling the polarity of the recording current applied to the coil of the write element such that a component perpendicular to an air bearing surface of the magnetization direction of the second ferromagnetic layer is in parallel with a component perpendicular to the air bearing surface of a magnetic field generated by the recording current applied to the read element at the end of a recording operation performed, i.e., the two components have the same sign.

Within the respective magnetic recording/reproducing devices having the read element including a giant magnetoresistive layer, each of the devices having means for controlling a bias current applying means may additionally include stabilizing means for controlling the bias current applying means to make an absolute value of a bias current applied to the read element during a stabilizing operation larger than a predetermined value of the bias current applied during a normal reproducing operation.

The respective magnetic recording/reproducing devices described above may be configured such that the bias current applying means also functions as detecting current applying means for detecting an output signal of the read element so that the bias current is also used as the detecting current.

Furthermore, the respective magnetic recording/reproducing devices may additionally include means for controlling the bias current applying means during a stabilizing operation to regulate the absolute value of the bias current to be equal to or more than 1.1 times a predetermined value of the bias current applied during a normal reproducing operation and equal to or less than five times the predetermined value.

As described above, the present invention provides magnetic recording/reproducing devices which optimally control a magnetic field leaking from a medium, a recording magnetic field generated by a write element, and the magnitude and direction of a bias field generated by a current flowing through a read element to recover a read waveform to a normal state even when fluctuations in read waveform cause an error in a reproducing operation and to prevent the fluctuations in read waveform from occurring, thus making it possible to reduce errors.

DESCRIPTION OF THE PREFERRED EMBODIMENTS

The present invention will hereinafter be described in connection with various embodiments thereof with reference to the accompanying drawings. It should be understood that while a hard disk device is described herein as an example of a magnetic recording/reproducing device, the present invention is not limited to this particular form of magnetic recording/reproducing devices to which the present invention is applicable, but is also applicable to a disk-replaceable magnetic disk device, a magnetic tape device, and so on.

(Embodiment 1)

Figure 2:
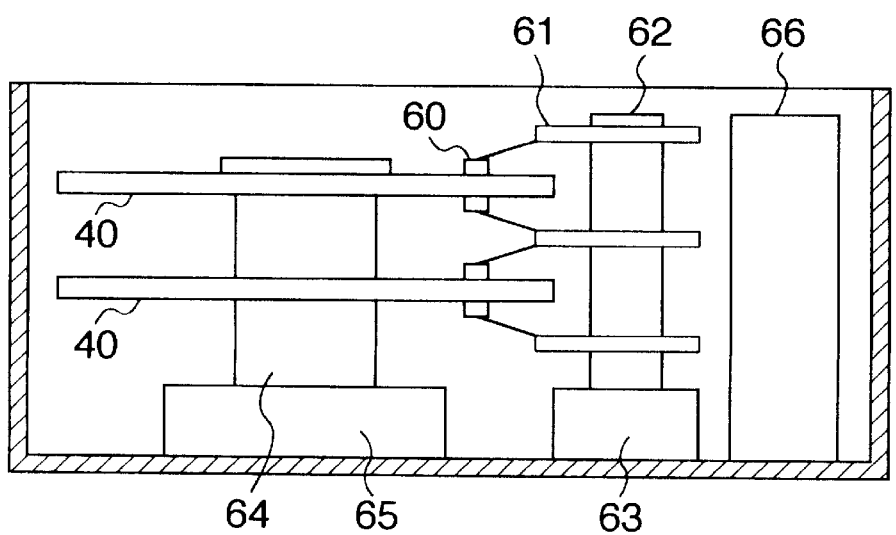
FIG. 2 is a schematic diagram illustrating a hard disk device according to an embodiment of the present invention.

FIG. 2 generally illustrates a hard disk device according to an embodiment of the present invention. The illustrated device comprises a disk rotating shaft 64 and a spindle motor 65 for rotating the disk rotating shaft 64 at a high speed. One or a plurality of disks 40 (two in this embodiment) are mounted on the disk rotating shaft 64 at predetermined intervals. Thus, the respective disks 40 are rotated integrally with the disk rotating shaft 64. Each of the disks 40 is a disk-like medium having a predetermined radius and thickness, and permanent magnet layers are formed on both surfaces to provide recording surfaces for recording information. The hard disk device also includes a positioning rotating shaft 62 outside the disks 40 for positioning heads and a voice coil motor 63 for driving the rotating shaft 62. A plurality of access arms 61 are mounted to the head positioning rotating shaft 62, and a read/write head (hereinafter simply referred to as the "head") is mounted at the tip of each access arm 61. With this structure, each head 60 is moved in a radial direction above an associated disk 40 and positioned at a predetermined location when the head positioning rotating shaft 62 is rotated by a predetermined angular distance. Also, each head 60 is held at a distance of several tens of nanometers (nm) from the surface of the associated disk 40 by a balance of a floating force produced when the disk is rotated at a high speed and an urging force of an elastic gimbal forming part of the access arm 61. The spindle motor 65 and the voice coil motor 63 are respectively connected to a hard disk controller 66 such that a rotational speed of the disks 40 and the positions of the heads 60 are controlled by the hard disk controller 66.

Figure 3:
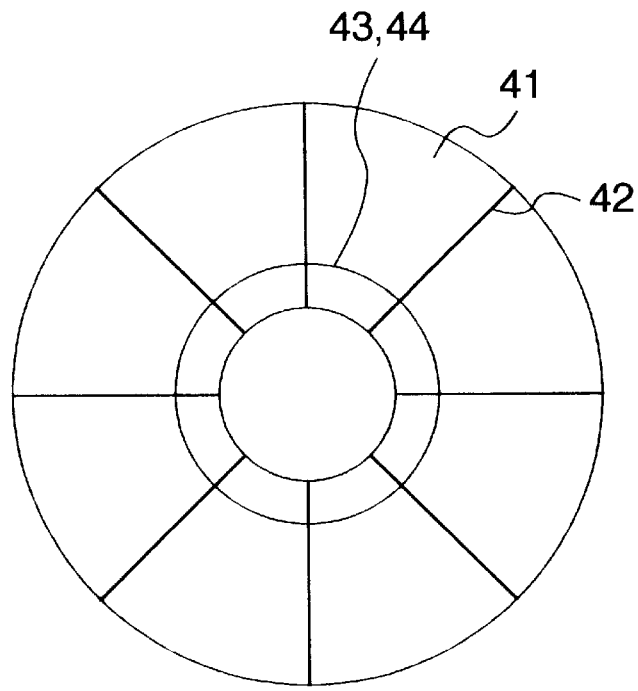
FIG. 3 is a schematic diagram illustrating the structure of a disk which may be used in the hard disk device according to the present invention.

Each information recording surface of the disks 40 is formed with a plurality of servo regions 42 in the radial direction thereof. In each servo region 42, an identification signal for a track number (gray code), a signal for positioning an associated head 60 (burst pattern) are recorded as servo signals. Each of the heads 60 reads the servo signals to know a current position, while the voice coil motor 63 is controlled in response to the read servo signals to position the heads 60. The remaining space of the servo region 42 is mostly used as a data track region 41 for recording information, however, a portion thereof is in some cases allocated to a head recovering region 43 and a CSS (Contact-Start-Stop) region 44. The data track region 41 is formed with a plurality of data tracks arranged concentrically in the radial direction at a predetermined track pitch. Information is recorded on and reproduced from each data track by the associated head 60 in the direction in which the disks 40 are rotated. The head recovering region 43 is a region provided for stabilizing a magnetoresistive read element constituting the head 60 and is allocated separately from the data track region 41. The CSS region 44 is a region above which an associated head 60 is positioned when a main power supply of the hard disk device is turned ON and OFF, or when the spindle motor 65 is stopped or rotated at a low speed for saving power consumption (i.e., in a standby mode in which circuits associated with interface are in operation). The CSS region 44 is also allocated separately from the data track region 41. The CSS region 44 is provided because when the spindle motor 65 is stopped or rotated at a low speed, each head 60 is likely to contact with an associated disk 40 to destroy part of information recorded at a contacted position. Some hard disk devices may perform a load-unload operation for the same purpose instead of the CSS operation. In the latter case, when the spindle motor 65 is stopped or rotated at a low speed, the heads 60 are unloaded away from the disks 40, so that the CSS region is not necessary. The embodiment of FIG. 3 illustrates an example in which the head recovering region 43 serves also as the CSS region 44.

Figure 1:
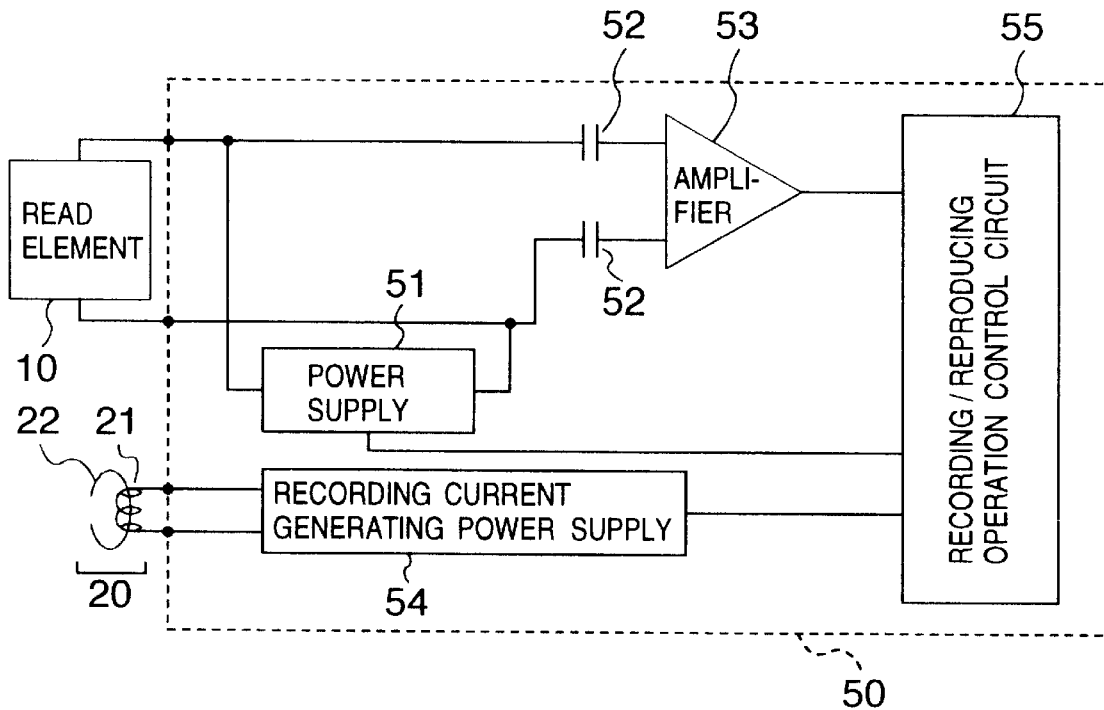
FIG. 1 is a block diagram generally illustrating the configuration of a recording/reproducing circuit block and component associated therewith in a magnetic recording/reproducing device according to the present invention.

The hard disk controller 66 has a recording/reproducing circuit block 50 illustrated in FIG. 1 together with a rotational speed control unit for the disks 40 and a positioning control unit for the heads 60. The recording/reproducing circuit block 50 comprises a power supply 51 (a regulated current source or a regulated voltage source) for applying a bias current functioning also as a detecting current to a read element 10 constituting the head 60; a capacitor 52 for cutting a direct current component of a signal; an amplifier 53 for amplifying an output signal; a recording current generating power supply 54 for applying a recording current to a coil 21 of a write element 20 constituting the head 60; and a recording/reproducing operation control circuit 55 for controlling the operations of these components. The recording/reproducing operation control circuit 55 controls a bias current applying power supply 51 to control the magnitude, direction and applying timing of a bias current, detects an output signal, and decodes the output signal encoded for recording/reproducing operations to an original state. In this event, the output signal encoded for recording/reproducing operations includes an error correcting code which serves as a basis to correct reproduced information. If the correction is not effective, an error is determined and a reproducing operation is repeated a certain number of times within a predetermined number of times with a hope that a normal operation is recovered. However, if an error still continues even after the reproducing operation has been repeated, the recording/reproducing operation control circuit 55 activates stabilizing means as later described. Also, the recording/reproducing operation control circuit 55 controls the recording current generating power supply 54 based on an input signal to adjust a pattern and timing of applying the recording current to record information. In this event, for correctly recording information on a desired data track, the recording/reproducing operation control circuit 55 reads signals in the servo region 42 prior to the recording operation to position the associated head 60 above the desired data track. If the read operation is erroneous, causing a failure in positioning the head, the recording/reproducing operation control circuit 55 also activates the stabilizing means.

Figure 4:
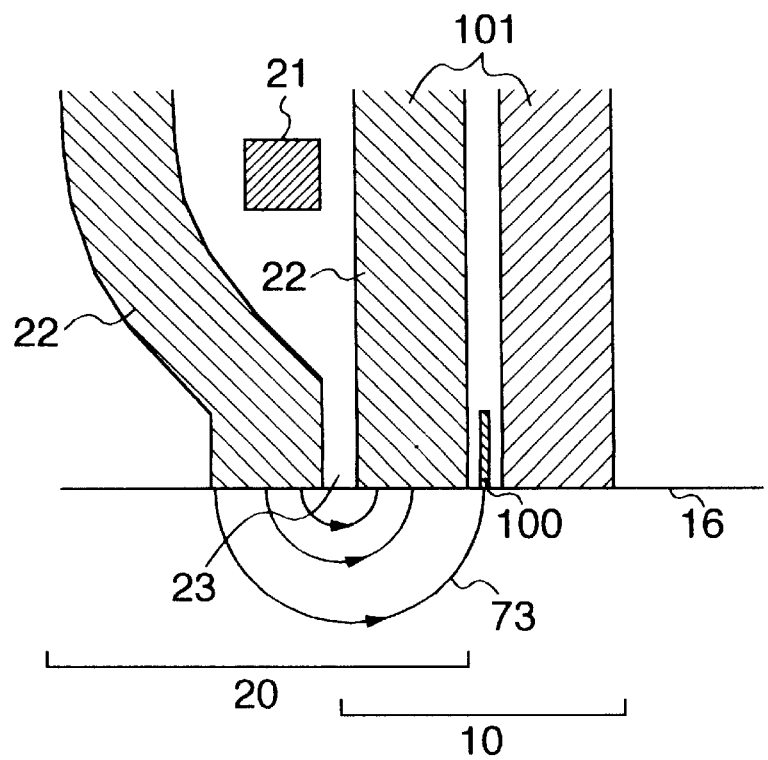
FIG. 4 is a cross-sectional view illustrating a head which constitutes the hard disk device according to the present invention.

Referring next to FIG. 4 illustrating an end portion of the head 60 in a cross-sectional view, the head has a write element 20 and a read element 10 laminated into an integral part. The write element 20 has a coil 21 which is applied with a recording current to generate flux and a pair of magnetic cores 22 for collecting the flux. Though not illustrated in FIG. 4, the pair of magnetic cores 22 are joined to each other in an upper portion of the drawing (on the opposite side to an air bearing surface 16) to form a magnetic circuit. The magnetic cores 22 are spaced by a magnetic gap 23 formed in the air bearing surface 16. Converged flux is applied to a medium from the magnetic gap 23 to record information thereon. The read element 10 has a laminate 100 including a magnetoresistive layer, a pair of leads (not shown) bonded to the structure 100, and a pair of magnetic shields for enhancing a spatial resolution during reproduction. One of the paired magnetic shields 101 located adjacent to the write element 20 serves as part of the magnetic core 22 constituting the write element 20. A portion of a recording magnetic field generated by the write element 20 also affects the laminate 100 including a magnetoresistive layer, which is thought to be a major cause of fluctuations in read waveform. Also, as described later, this magnetic field may be controlled to recover a read waveform which has once experienced disturbance.

While the laminate 100 including a magnetoresistive layer may be implemented in a variety of forms, FIGS. 5A–5C, 6A–6C, 7A–7C, 8A and 8B illustrate the structures and simplified operation principles of mainly employed ones.

Figure 5A:
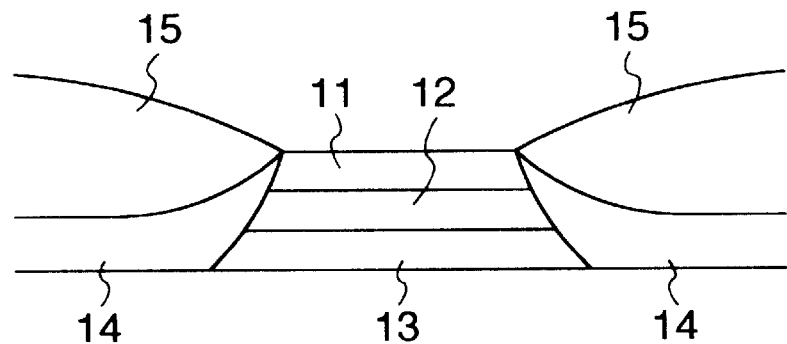
FIG. 5A illustrates an air bearing surface of an AMR read element which constitutes the hard disk device according to the present invention.

FIG. 5A illustrates an air bearing surface of an anisotropic magnetoresistive (AMR) element having a soft adjacent layer (SAL). The laminate 100 consists of an AMR layer 11, a non-magnetic conductive spacer 12, and an SAL 13. The AMR layer 11 is made of a soft magnetic alloy such as NiFe, CoFe, NiFeCo, CoNiFe, or the like, and has a thickness set at an optimal value approximately in a range of 10 rm to 30 rm. The spacer 12 is made of Ta or the like and has a thickness set at an optimal value approximately in a range of 5 nm to 20 rm. The SAL 13 is made of a soft magnetic alloy such as NiFeCr, NiFeRh, NiFe, or the like and has a thickness set at an optimal value approximately in a range of 10 nm to 40 nm. For holding the AMR layer 11 and the SAL 13 in a single domain structure, a domain control layer 14 composed of a permanent magnet layer made of CoPt, CoCrPt, CoCrTa, or the like and an underlying layer for controlling the orientation of the permanent magnet layer is arranged on each side of the laminate 100. A pair of leads 15 are formed of metal layers made of Au, Cu, Ta, or the like laminated on the respective domain control layers 14. The domain control layer 14 may be replaced with a laminate composed of a ferromagnetic layer made of an alloy in an NiFe group and an antiferromagnetic layer made of an alloy in an FeMn group or an alloy in an NiMn group or the like.

Figure 5B:
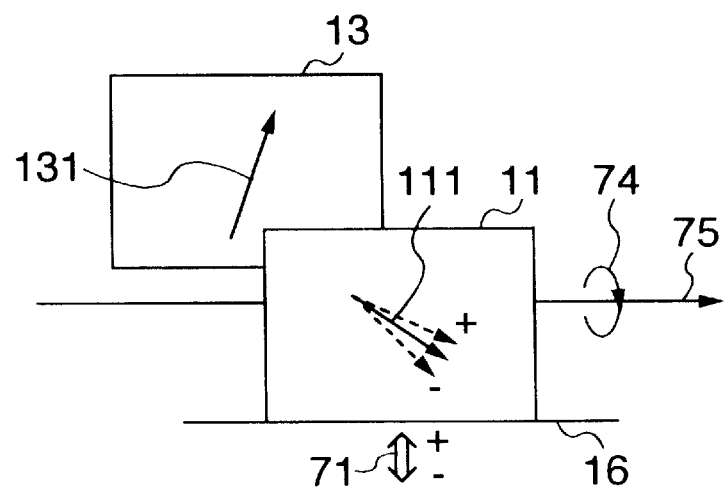
FIGS. 5B, 5C are top expansion plan views showing the operation of the AMR read element illustrated in FIG. 5A.
Figure 5C:
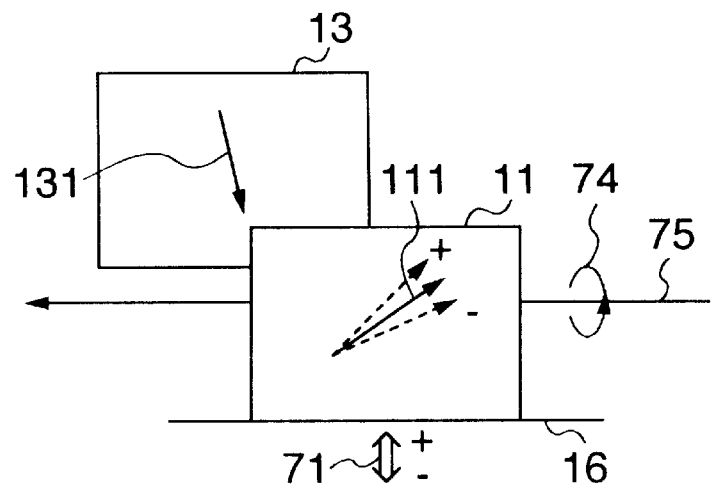

Next, the operation of the AMR element will be briefly described with reference to expansion plan views of the AMR element, seen from the top, illustrated in FIGS. 5B, 5C. When the AMR element is applied with the bias current 75 in the right-hand direction, average magnetization 131 of the SAL 13 is oriented substantially upward by a magnetic field generated by the bias current 75. Receiving the downward magnetic field generated by the magnetization, average magnetization 111 of the AMR layer 11 is oriented approximately in a 450 downwardly inclined direction (FIG. 5B). Conversely, when the element AMR element is applied with the bias current 75 in the left-hand direction, the average magnetization 111 of the AMR film 11 is oriented approximately in a 45° upwardly inclined direction, i.e., in the direction (FIG. 5C) opposite to the case where the bias current 75 is applied in the right-hand direction. The AMR layer 11 exhibits the best linear response in these states. When the AMR element is applied with a leaking magnetic field 71 from a medium, the direction of the magnetization 111 of the AMR layer 11 responsively changes to cause a change in electrical resistance which is then detected as an electrical signal.

Figure 6A:
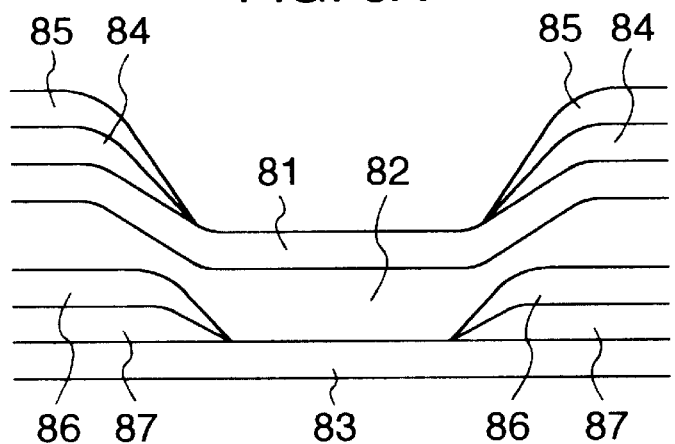
FIG. 6A illustrates an air bearing surface of a dual stripe AMR read element which constitutes the hard disk device according to the present invention.

FIG. 6A illustrates an air bearing surface of a dual stripe AMR element having two AMR layers. A laminate 100 consists of three layers: a first AMR layer 81, a spacer 82 made of a non-magnetic insulating material, and a second AMR layer 83. Each of the AMR layers 81, 83 is made of a soft magnetic alloy such as NiFe, CoFe, NiFeCo, CoNiFe, or the like, and has a thickness set at an optimal value approximately in a range of 10 nm to 30 nm. The spacer 82, made of an insulating material such as $Al_2O_3$, $SiO_2$, or the like, has a thickness set at an optimal value approximately in a range of 30 nm to 80 nm and electrically isolates the first AMR layer 81 and the second AMR layer 83. For holding the respective AMR layers 81, 83 in a single domain structure, antiferromagnetic layers 84, 87 made of FeMn or the like for controlling the domains are directly laminated on the respective AMR layers in both end regions thereof. In addition, paired leads 85, 86 for the respective AMR layers are laminated on the respective antiferromagnetic layers 84, 87.

Figure 6B:
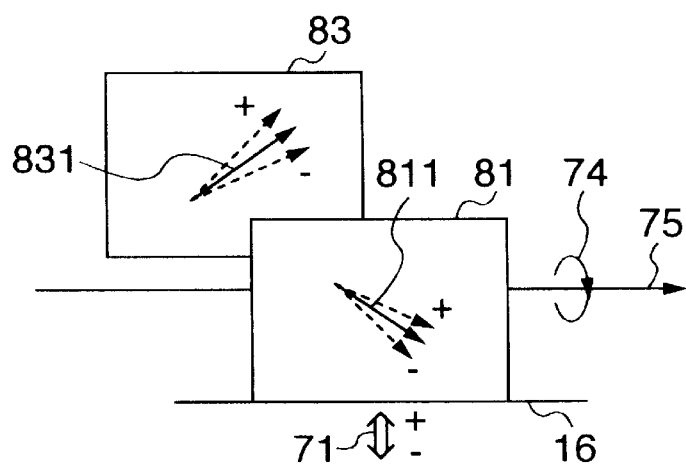
FIGS. 6B, 6C are top expansion plan views showing the operation of the dual stripe AMR read element illustrated in FIG. 6A.
Figure 6C:
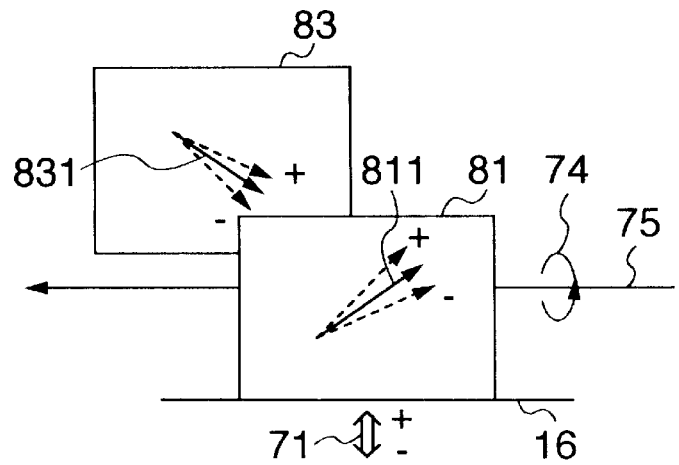

FIGS. 6B, 6C are expansion plan views of the AMR element seen from the top. When the AMR element is applied with the bias current 75 in the right-hand direction (FIG. 6B), the average magnetization 811 of the first AMR layer 81 is oriented in a downwardly inclined direction, while the average magnetization 831 of the second AMR layer 83 is oriented in an upwardly inclined direction, both by the action of a magnetic field 74 generated by the bias current 75. Conversely, when the AMR element is applied with the bias current 75 in the left-hand direction (FIG. 6C), the respective average magnetization 811, 831 are oriented in the opposite directions to the above, i.e., in the upwardly inclined direction and in the downwardly inclined direction, respectively. When the AMR element is applied with a leaking magnetic field 71 from a medium, the directions of the magnetizations 811, 831 of the respective AMR layers 81, 83 responsively change to cause changes in electrical resistance which are detected as electrical signals.

Figure 7A:
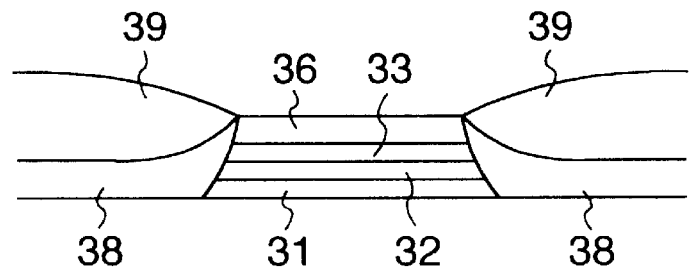
FIG. 7A illustrates an air bearing surface of a spin valve GMR read element which constitutes the hard disk device according to the present invention.

FIG. 7A illustrates an air bearing surface of an element having a spin valve layer which is a type of GMR layer. A laminate 100 comprises a first ferromagnetic layer 31, a non-magnetic conductor layer 32, a second ferromagnetic layer 33, and an antiferromagnetic layer 36 for fixing a magnetization direction of the second ferromagnetic layer 33. The first ferromagnetic layer 31, which acts as a free layer, is composed of a laminate, for example, including an NiFe layer having a thickness approximately in a range of 1 nm to 10 nm and a Co or CoFe layer having a thickness approximately in a range of 0.5 nm to 5 nm. The non-magnetic conductor layer 32 is formed, for example, of a Cu layer having a thickness approximately in a range of 1 nm to 4 nm. The second ferromagnetic layer 33, which acts as a pinned layer, is formed, for example, of a Co layer having a thickness approximately in a range of 1 nm to 5 nm. The antiferromagnetic layer 36 is formed, for example, of an FeMn layer having a thickness approximately in a range of 6 nm to 30 nm. For holding the first ferromagnetic layer 31 in a single domain structure, a domain control layer 38 composed of a permanent magnet layer made of CoPt, CoCrPt, CoCrTa, or the like and an underlying layer for controlling the orientation of the permanent magnet layer is arranged on both sides of these layers. A pair of leads 39 are laminally formed on the respective domain control layers 38. Next, the operation of the spin valve element will be briefly described with reference to expansion plan views of the spin valve element, seen from the top, illustrated in FIGS. 7B, 7C. A direction of average magnetization 331 of the second ferromagnetic layer 33 is fixed to point to the air bearing surface by the antiferromagnetic layer 36. Thus, the magnetization direction of the second ferromagnetic layer 33 is fixed irrespective of the direction of the bias current 75 applied to the element. For this reason, the first ferromagnetic layer 31 always receives an upward magnetic field generated by the magnetization 331 of the second ferromagnetic layer 33. The best linear response is therefore achieved when the bias current 75 is applied in the left-hand direction (FIG. 7B) i.e., when the magnetic field 74 generated by the bias current 75 and sensed by the first ferromagnetic layer 31 is in the downward direction. When the bias current 75 is applied in the right-hand direction (FIG. 7C), a magnetic field generated by the magnetization 331 of the second ferromagnetic layer 33 and a magnetic field 74 generated by the bias current 75 are in the same direction, so that the magnetization 311 of the first ferromagnetic layer 31 is oriented in an upwardly inclined direction. When the spin valve element is applied with a leaking magnetic field 71 from a medium, the magnetization 331 of the first ferromagnetic layer 31 changes its direction in response thereto. The change in direction of the magnetization 331 results in a change in an angle between the direction of the magnetization 311 of the first ferromagnetic layer 31 and the direction of the magnetization 331 of the second ferromagnetic layer 33, thus causing a change in electrical resistance which is then detected as an electrical signal.

Figure 8A:
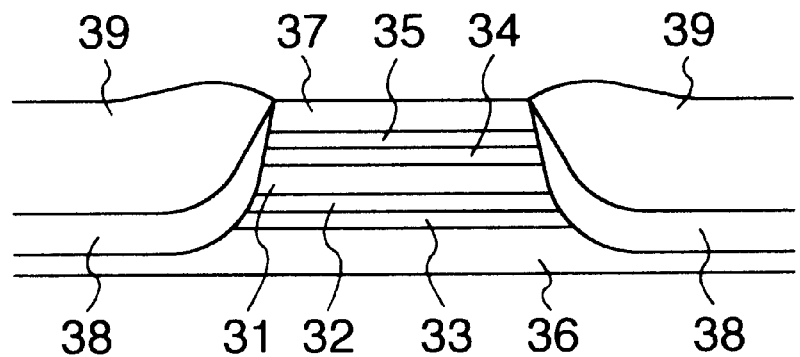
FIG. 8A illustrates an air bearing surface of a dual spin valve GMR read element which constitutes the hard disk device according to the present invention.

FIG. 8A illustrates an air bearing surface of an element having a dual spin valve layer which is a type of GMR layer. A laminate 100 comprises a first ferromagnetic layer 31, a second ferromagnetic layer 33, a non-magnetic conductor layer 32 inserted between the first ferromagnetic layer 31 and the second ferromagnetic layer 33, a third ferromagnetic layer 35, a non-magnetic conductor layer 34 inserted between the first ferromagnetic layer 31 and the third ferromagnetic layer 35, an antiferromagnetic layer 36 for fixing a magnetization direction of the second ferromagnetic layer 33, and an antiferromagnetic layer 37 for fixing a magnetization direction of the third ferromagnetic layer 35. The first ferromagnetic layer 31, acting as a free layer, is composed of a laminate including, for example, an NiFe layer having a thickness approximately in a range of 1 nm to 10 nm and a Co or CoFe layer having a thickness approximately in a range of 0.5 nm to 5 nm. The respective non-magnetic layers 32, 34 are formed, for example, of a Cu layer having a thickness approximately in a range of 1 nm to 4 nm. The second ferromagnetic layer 33 and the third ferromagnetic layer 35, acting as pinned layers, are each formed, for example, of a Co layer having a thickness approximately in a range of 1 nm to 5 nm. It should be noted that the two ferromagnetic layers 33, 35 need not be equal in thickness. In this embodiment, the second ferromagnetic layer 33 is formed thinner. The antiferromagnetic layer 36 is formed, for example, of an NiO layer having a thickness approximately in a range of 30 nm to 50 nm, while the antiferromagnetic layer 37 is formed, for example, of an FeMn layer having a thickness approximately in a range of 6 nm to 30 nm. For holding the first ferromagnetic layer 31 in a single domain structure, a domain control layer 38 composed of a permanent magnet layer made of CoPt, CoCrPt, CoCrTa, or the like and an underlying layer for controlling the orientation of the permanent magnet layer is arranged on both sides of the laminated layers mentioned above. A pair of leads 39 are laminally formed on the respective domain control layers 38.

Figure 8B:
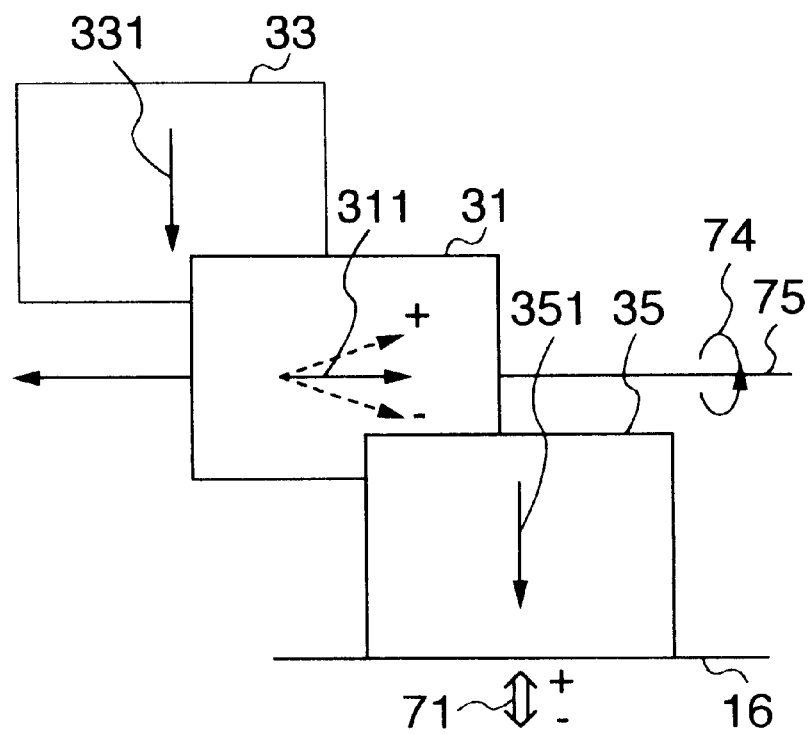
FIG. 8B is a top expansion plan view showing the operation of the dual spin valve GMR read element illustrated in FIG. 8A.

Next, the operation of the dual spin valve element will be briefly described with reference to an expansion plan view of the spin valve element, seen from the top, illustrated in FIG. 8B. A direction of average magnetization 331 of the second ferromagnetic layer 33 and a direction of average magnetization 351 of the third ferromagnetic layer 35 are fixed to point to the air bearing surface by the antiferromagnetic layer 36 and the antiferromagnetic layer 37, respectively. Thus, their magnetization directions are fixed irrespective of the direction of the bias current 75 applied to the element. In addition, a magnetic field 74 generated by the bias current 75 and received by the first ferromagnetic layer 31 is canceled when the layers (34, 35, 37) overlying the first ferromagnetic layer 31 and the layers (32, 33, 36) underlying the first ferromagnetic layer 31 are equal in electrical resistance. However, in this embodiment, since the antiferromagnetic layer 36 is made of an insulating material, i.e., NiO, and the second ferromagnetic layer 33 has a thickness smaller than that of the third ferromagnetic layer 35, the overlying layers (34, 35, 37) have a lower resistance than the underlying layers 20 (32,33, 36). Thus, the magnetic field 74 generated by the bias current 75 and received by the first ferromagnetic layer 31 is in the downward direction when the bias current is applied in the left-hand direction. In this situation, the best linear response is achieved. When the bias current 75 is applied in the right-hand direction, a magnetic field generated by the magnetization 331 of the second ferromagnetic layer 33 and a magnetic field generated by the magnetization 351 of the third ferromagnetic layer 35, are in the same direction as a magnetic field 74 generated by the bias current 75, so that the magnetization 311 of the first ferromagnetic layer 31 is oriented in an upward inclined direction. When the dual spin valve element is applied with a leaking magnetic field 71 from a medium, the magnetization 311 of the first ferromagnetic layer 31 changes its direction in response thereto. The change in direction of the magnetization 311 results in a change in an angle between the direction of the magnetization 311 of the first ferromagnetic layer 31 and the direction of the magnetization 331 of the second ferromagnetic layer 33 or the direction of the magnetization 351 of the third ferromagnetic layer 35, thus causing a change in electrical resistance which is then detected as an electrical signal.

As described above, in the respective illustrative AMR elements and GMR elements, the bias current 75 is applied to the elements to apply a bias field to the AMR layer of the AMR elements or the first ferromagnetic layer of the GMR elements, thus causing the rotation of the magnetization of the respective layers to achieve the best linear response. It is therefore understood that by appropriately controlling the magnitude, direction, and so on of the bias current 75, the magnetization direction of the AMR layer or the first ferromagnetic layer can be relatively freely controlled.

In this embodiment, the bias current applying power supply 51 is designed to generate a larger bias current 75 when the stabilizing means is activated for the read element than during a normal reproducing operation. More specifically, means is provided for controlling the bias current applying power supply 51 to increase the magnitude of the bias current 75 applied to the read element 10 over the bias current 75 applied during a normal reproducing operation, when the read element 10 is being applied with a leaking magnetic field 71 from a medium, i.e., when the disk 40 is being rotated at a predetermined speed with the head being positioned above the data track regions 41 and held at a predetermined distance of several tens of nanometers from the surface of the disk 40.

Next explained is an example in which the stabilizing means is activated to suppress fluctuations in read waveform, which is a cause of errors in a reproducing operation, i.e., to recover an original state from a corrupted waveform. In this example, the AMR element having a SAL illustrated in FIG. 5 is used as an example of the read element 10.

Figure 9A:
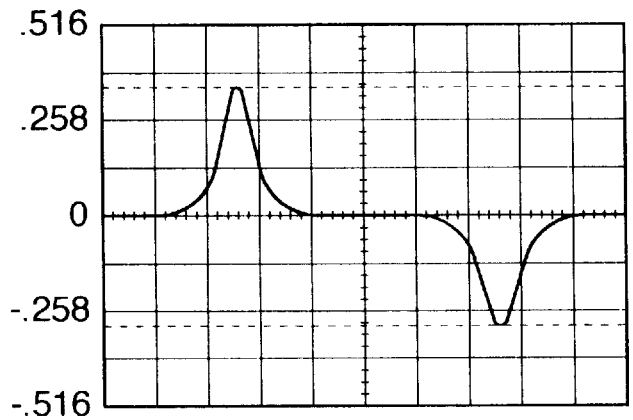
FIG. 9A illustrates a normal waveform reproduced by an AMR element.
Figure 9B:
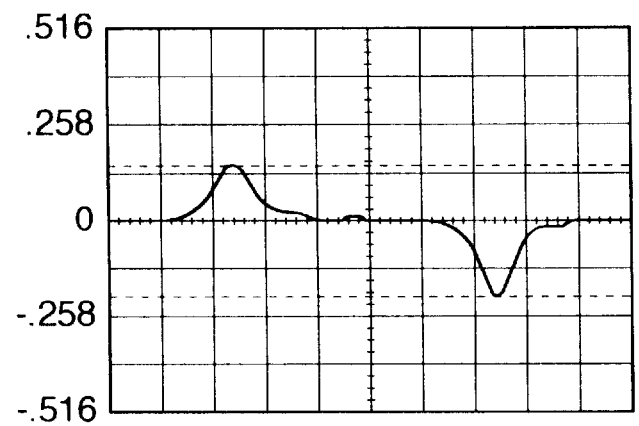
FIG. 9B illustrates a waveform reproduced by the AMR element when fluctuations in read waveform are present.
Figure 9C:
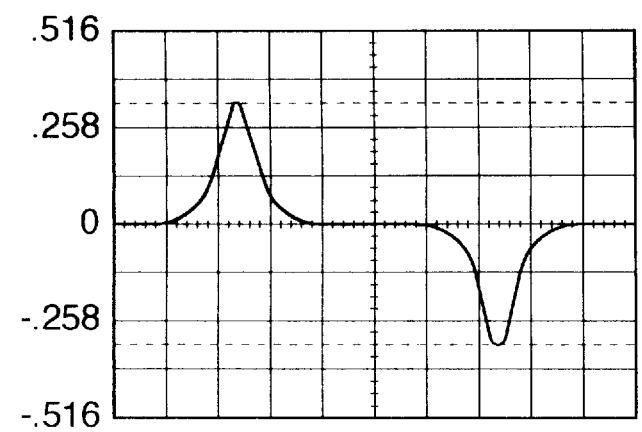
FIG. 9C is a waveform reproduced by the AMR element after it has recovered a normal operation.

FIGS. 9A–9C illustrate read waveforms generated when a bias current of +10 mA is applied during a reproducing operation. FIG. 9A illustrates a normal waveform; FIG. 9B illustrates an abnormal waveform having a lower output which is observed after fluctuations have occurred in the read waveform; and FIG. 9C illustrates a read waveform after a bias current of +20 mA has been applied as a stabilizing operation. Assume in this example that the right direction is defined as a positive direction for the bias current. In FIG. 9B, the output is reduced to approximately one half of the original level, so that it can be thought that an error is caused by an insufficient signal-to-noise (S/N) ratio for normally operating the hard disk device. However, by executing the stabilizing operation, the read waveform is recovered to have a high signal level as illustrated in FIG. 9C. As a result, the signal-to-noise (S/N) ratio is increased to a sufficient level to permit the hard disk device to recover a normal operation.

Figure 10A:
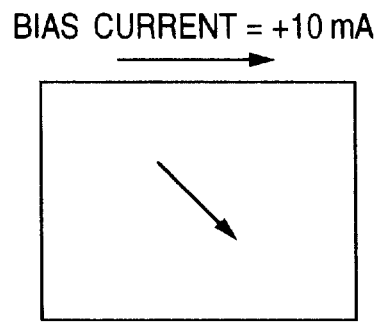
FIGS. 10A–10D are simplified diagrams illustrating the results of measuring a magnetization direction of an AMR layer.
Figure 10B:
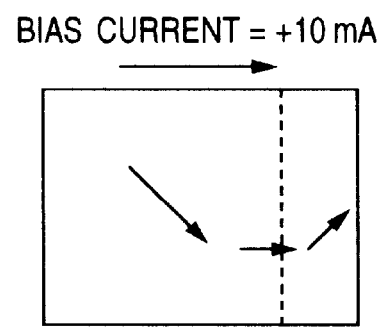
Figure 10C:
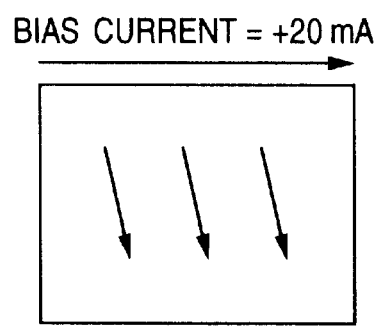
Figure 10D:
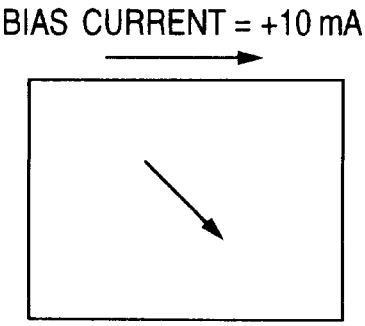

To clarify why the hard disk device can recover its normal operation, the results of measuring the magnetization direction of the AMR layer 11 (indicated by arrows) are illustrated in FIGS. 10A–10D. FIG. 10A corresponds to FIG. 9A (the bias current =+10 mA), and it can be seen from FIG. 10A that the AMR layer 11 remains in a single domain state when the normal waveform is observed. FIG. 10B corresponds to FIG. 9B (the bias current =+10 mA), where the magnetization at the right end of the AMR layer is diagonally to the upper right direction in the lower output state, so that the entire magnetization direction is twisted, thus failing to hold the AMR layer in the single domain state. FIG. 10C illustrates a state in which a bias current of +20 mA is being applied as the stabilizing operation. Since a larger bias current is being applied in the right direction, the AMR layer is applied with a strongly downward bias field. This bias field causes the magnetization of the AMR layer to turn downwardly as a whole. Consequently, the twisted magnetization present at the right end of the AMR layer is eliminated to establish a single domain state. Thus, even after the bias current is returned to the predetermined +10 mA, the AMR layer remains in the single domain state, as illustrated in FIG. 10D. In this way, the read waveform as illustrated in FIG. 9C is recovered from the abnormal waveform of FIG. 9B.

As described above, when the read element is applied with a large bias current, i.e., a large bias field while it is also applied with a leaking magnetic field from a medium, an erroneously read waveform is recovered to its original state. However, even if the bias current is increased up to +25 mA, for example, when the head is separated away from the disk, i.e, when the read element is not applied with a leaking magnetic field from a medium, no significant recovery of the read waveform is observed. It can be thought that the waveform is recovered with a smaller bias current when the leaking magnetic field from the medium is applied to the read element because the read element is applied with a large magnetic field which is the sum of the bias field and the leaking magnetic field from the medium. While a larger magnetic field is generated when a larger bias current is applied, an excessively large bias current would result in a large amount of heat generated from the read element and increased electromigration (a phenomenon in which a portion of a layer is damaged by application of a current over a long time), thus posing a problem in terms of reliability. Thus, the stabilizing operation is desirably executed while the read element is being applied with a leaking magnetic field from a medium.

(Embodiment 2)

For designing a hard disk device to implement the stabilizing means for the read element, the recording/reproducing operation control circuit 55 may be provided with means for controlling the recording current generating power supply 54 and the bias current applying power supply 51, when information is recorded, to apply a recording current to the coil 22 constituting the write element 20 and simultaneously make the magnitude of the bias current 75 larger than during a normal reproducing operation.

When a stabilizing operation of the present invention is conducted, a read waveform can be recovered with a bias current of approximately +15 mA in the AMR element used in Embodiment 1. When information is recorded, the disk 40 is rotated at a predetermined high speed, and the head 60 is positioned above a desired data track and held at a predetermined distance of several tens of nanometers from the surface of the respective disk 40. Thus, the read element 10 is applied with a leaking magnetic field 71 from a medium in addition to a portion of a recording magnetic field 73 generated by the write element 20 (see FIG. 4). In this way, since a portion of the recording magnetic field 73 is multiplexed with the leaking magnetic field 71, it can be thought that Embodiment 2 can recover a read waveform with a smaller bias current than Embodiment 1. Thus, Embodiment 2 is advantageous over Embodiment 1 in terms of reliability. In addition, although a recording operation causes a read waveform to be more susceptible to fluctuations, i.e., the sum of a recording magnetic field and a leaking magnetic field from a medium adversely affects the read element, these magnetic fields act to recover the read waveform by applying a larger bias current during a recording operation in this embodiment. It is therefore possible to limit the probability of fluctuations in read waveform to a low value by applying a larger bias current not only when a read waveform is recovered but also during every recording operation, during periodic recording operations, or during a recording operation performed by an instruction from an operator or a host computer.

(Embodiment 3)

For designing a hard disk device to implement the stabilizing means for the read element, the recording/reproducing operation control circuit 55 may be provided with means for controlling the recording current generating power supply 54 and the bias current applying power supply 51. In a stabilizing operation, the hard disk controller 66 controls the voice coil motor 63 to move the head 60 to the head recovering region 43, and then the recording/reproducing operation control circuit 55 activates the means to control the recording current generating power supply 54 and the bias current applying power supply 51, when the head 60 remains above the head recovering region 43, to apply a recording current to the coil 22 constituting the write element 20 and simultaneously make the magnitude of the bias current 75 larger than the magnitude of the bias current 75 applied during a normal reproducing operation.

As described above, signals recorded on a servo region 42 are read to appropriately position a head in order to record information on a desired data track. In this event, if the head cannot be appropriately positioned due to an error in a read operation, the hard disk device is controlled not to perform a recording operation. This is because information recorded in an incorrect position is likely to erroneously destroy previously recorded information. Also, when a reproducing operation is performed, correct positioning of the head may also be prevented by an error in the reproducing operation. In these cases, a head 60 is first moved to the head recovering region 43. It should be noted that in this event, since a head suffering from a trouble cannot be correctly positioned, another correct head is used to roughly position the troublesome head. As illustrated in FIG. 2, since all heads 60 are mounted to the single positioning rotating shaft 62, another head can be used for positioning instead of a troublesome head. After the troublesome head is positioned above the head recovering region 43, a large bias current is applied while a recording operation is advanced. When the stabilizing operation of Embodiment 3 is performed on the AMR element used in Embodiment 1, the recovery of a read waveform can be accomplished with a bias current of appropriately +15 mA, as is the case of Embodiment 2. After the troublesome head is recovered to a normal state by the action of the stabilizing operation, the recovered head 60 is moved to the foregoing desired data track position for performing recording/reproducing operations. The stabilizing operation of Embodiment 3 may be performed on a periodic basis or by an instruction of an operator or a host computer.

(Embodiment 4)

While the read waveform can be recovered with a large bias current in the positive direction in the foregoing embodiments, the current in the positive direction is not always effective in the recovery. Thus, the hard disk devices of the respective embodiments described above may be designed such that the bias current applying power supply 51 can apply a bias current both in a positive direction and in a negative direction.

Figure 11A:
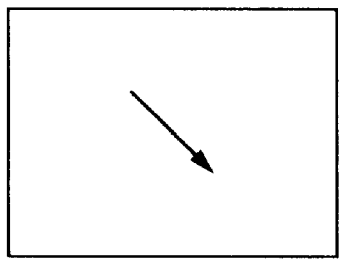
FIGS. 11A–11F are simplified diagrams illustrating the results of measuring a magnetization direction of the AMR layer.
Figure 11B:
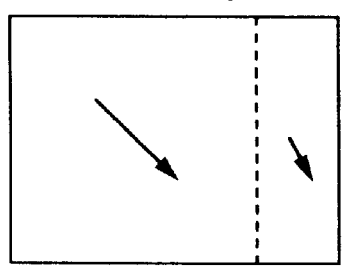
Figure 11C:
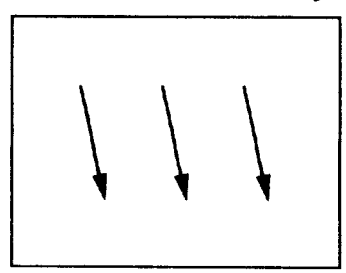
Figure 11D:
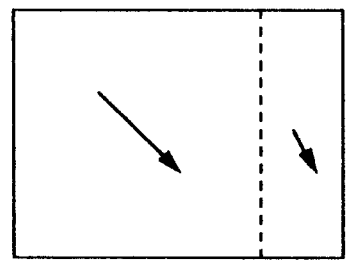
Figure 11E:
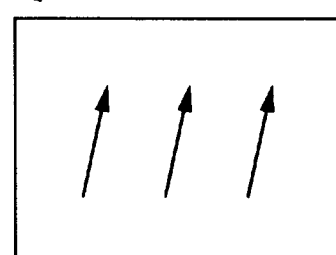
Figure 11F:
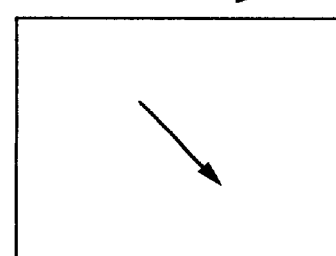

FIGS. 11A–11F illustrate the results of measuring the magnetization direction of the AMR layer 11 in the AMR element used in Embodiment 1 when the magnetization direction is twisted in a different form from the aforementioned example. Arrows in the figures indicate the magnetization direction of the AMR layer 11. In a state illustrated in FIG. 11A, the AMR layer remains in a single domain state. When the read waveform exhibits a low output, the magnetization at the right end turns to a lower right direction as illustrated in Fig. 11B so that the magnetization direction is twisted, whereby the AMR layer fails to remain in the single domain state. While a bias current of +20 mA is being applied as the stabilizing operation, the magnetization of the AMR layer turns downwardly as a whole due to a strong downward bias field generated by the large bias current, as illustrated in FIG. 11C. However, since the magnetization at the right end is initially oriented to a lower right direction, when the bias current is reduced again to +10 mA, the magnetization returns to the state of FIG. 11B, i.e., the low output state, as illustrated in FIG. 11D. Nevertheless, when a bias current of −20 mA is applied as the stabilizing operation, a strong upward bias field causes the magnetization of the AMR layer to turn upwardly as a whole. Consequently, the twisted magnetization at the right end is eliminated to restore the single domain state of the AMR layer. Therefore, even after the bias current is returned to the predetermined +10 mA, the AMR layer remains in the single domain state as illustrated in FIG. 11F. As a result, the read waveform is recovered to its normal state. In this way, by applying the bias current in both positive and negative directions, the read waveform can be recovered in any of the cases illustrated in FIGS. 10A–10D and 11A–11F.

(Embodiment 5)

For designing a hard disk device having a GMR element such as a spin valve element, a dual spin valve element, or the like, as illustrated in FIGS. 7A–7C and 8A–8B, to implement the stabilizing means for the GMR element, the recording/reproducing operation control circuit 55 may be provided with means for controlling the recording current generating power supply 54 to fix the polarity of a recording current applied to the coil 22 constituting the write element at the end of a recording operation. More specifically, assuming, in terms of a winding direction of the coil 22 constituting the write element 20, that a positive magnetic field is generated (the upward direction relative to the GMR element 10, see FIG. 4) when a positive current is applied by the recording current generating power supply 54, the polarity of the recording current is determined such that a recording operation is terminated always after a negative recording current is applied.

Figure 7B:
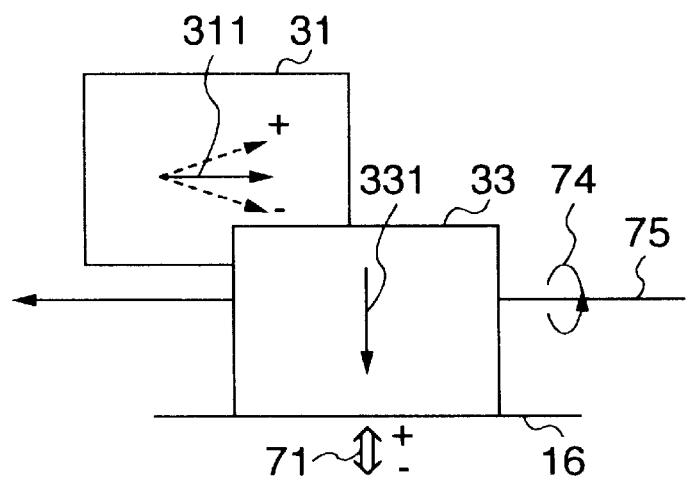
FIGS. 7B, 7C are top expansion plan views showing the operation of the spin valve GMR read element illustrated in FIG. 7A.
Figure 7C:
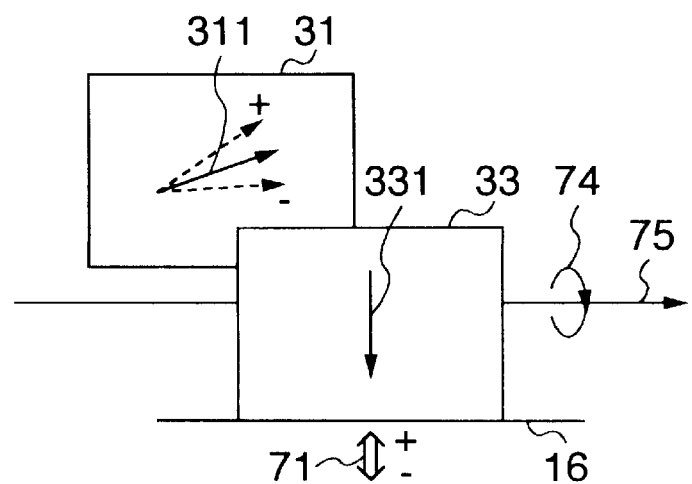
Figure 12A:
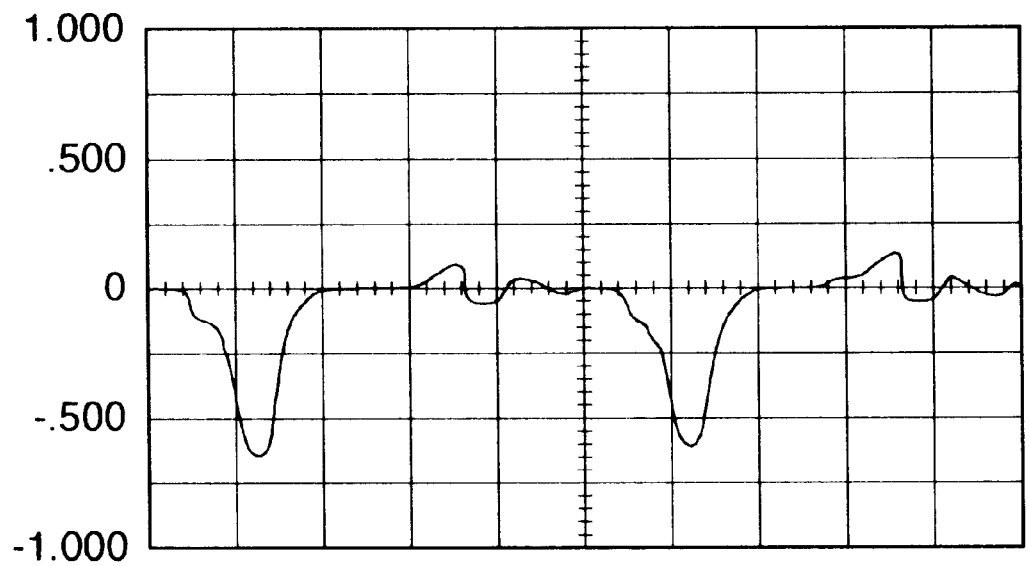
FIG. 12A illustrates a waveform reproduced when a spin valve element suffers from fluctuations in read waveform.
Figure 12B:
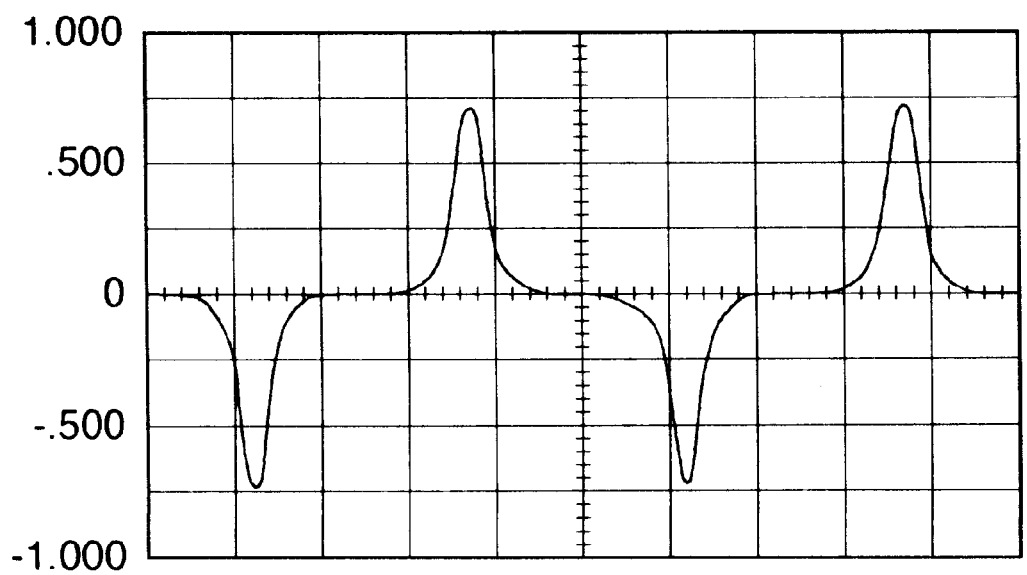
FIG. 12B illustrates a normal waveform reproduced by the spin valve element.

First, examples of read waveforms are shown for the case where the stabilizing means is activated and for the case where it is not activated. In these examples, a spin valve element illustrated in FIGS. 7A–7C is used as an example of the GMR element 10, and a bias current of 5 mA is applied in the left direction. FIG. 12A illustrates an example of a read waveform which is observed when a termination polarity is not determined for the recording current, and reveals that the hard disk device suffers from an error in a reproducing operation. FIG. 12B illustrates an example of a read waveform which is observed when the termination polarity is determined for the recording current. When the termination polarity is determined, the illustrated waveform can be stably reproduced, and the hard disk device is free from errors. Though not shown in detail, similar results are observed when the dual spin valve element illustrated in FIGS. 8A, 8B is used.

Figure 13A:
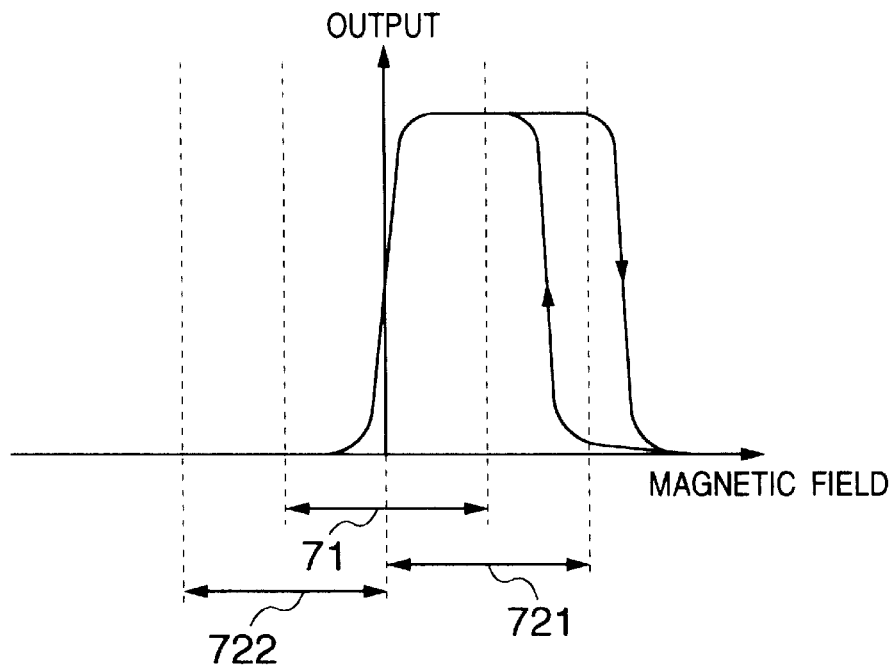
FIG. 13A is a graphic representation of the characteristic of a spin valve element derived when a magnetization direction of a second ferromagnetic layer is sufficiently fixed.
Figure 13B:
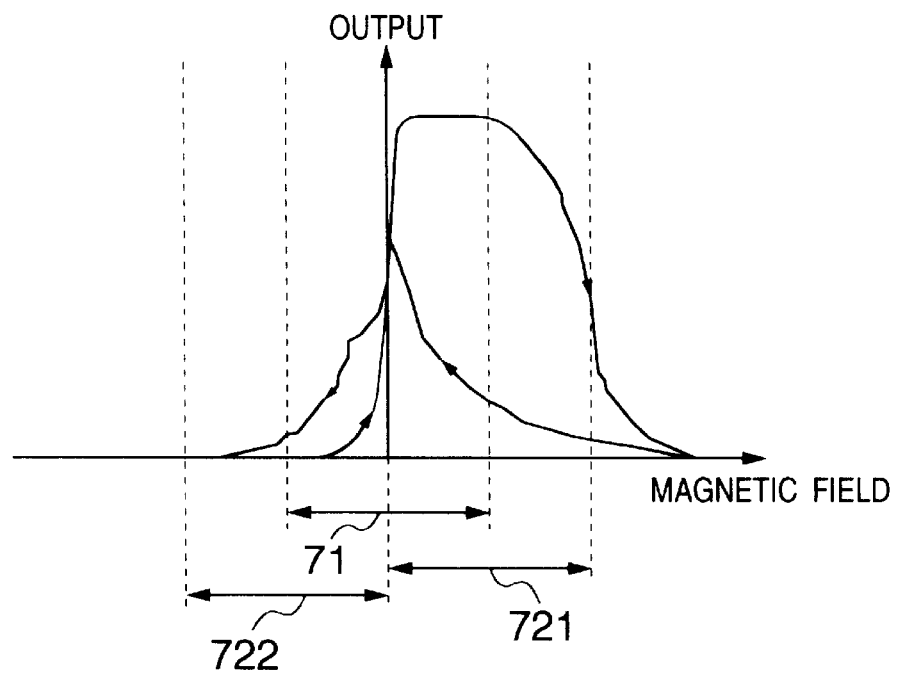
FIG. 13B is a graphic representation of the characteristic of a spin valve element derived when the magnetization direction of the second ferromagnetic layer is not sufficiently fixed.

To clarify why the determination of the termination polarity is effective in eliminating errors in a reproducing operation, a GMR element having a second ferromagnetic layer 33 with a sufficiently fixed magnetization direction and a GMR element having a second ferromagnetic layer 33 with an insufficiently fixed magnetization direction are fabricated for the purpose of comparison. Assume herein that a magnetization direction 331 of the second ferromagnetic layer 33 is determined to point to the air bearing surface 16 as illustrated in FIGS. 7A–7C. FIGS. 13A, 13B are characteristic curves illustrating the relationship between an applied magnetic field and an output for the two elements. The characteristic of the GMR element having the second ferromagnetic layer 33 with a sufficiently fixed magnetization direction does not exhibit hysteresis within a range 71 of a leaking magnetic field from a medium applied to the GMR element during a reproducing operation, as illustrated in FIG. 13A. On the other hand, the characteristic of the GMR element having the second ferromagnetic layer 33 with an insufficiently fixed magnetization direction does exhibit hysteresis within the range 71 of the leaking magnetic field from a medium applied to the GMR element during a reproducing operation, as illustrated in FIG. 13B. During a recording operation, the GMR element 10 is applied with a portion of a recording magnetic field (as 73 in FIG. 4) generated by the write element 20 in addition to the leaking magnetic field 71 from the medium. Therefore, a larger magnetic field, approximately double the magnetic field generated during the reproducing operation, may be applied during the recording operation.

Figure 14A:
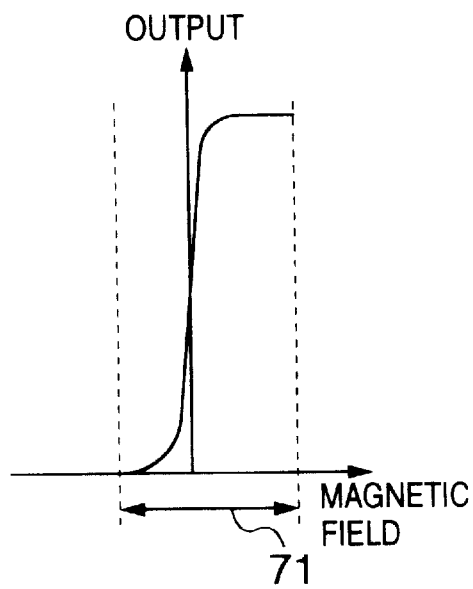
FIGS. 14A–14D are graphic representations of the characteristics of the spin valve element derived when the magnetization direction of the second ferromagnetic layer is sufficiently fixed (FIGS. 14A, 14B) and when the magnetization direction of the second ferromagnetic layer is not sufficiently fixed (FIGS. 14C, 14D), after the spin valve element is applied with a maximum magnetic field generated when a recording magnetic field is positive (FIGS. 14A, 14C) or negative (FIGS. 14B, 14D), respectively.
Figure 14B:
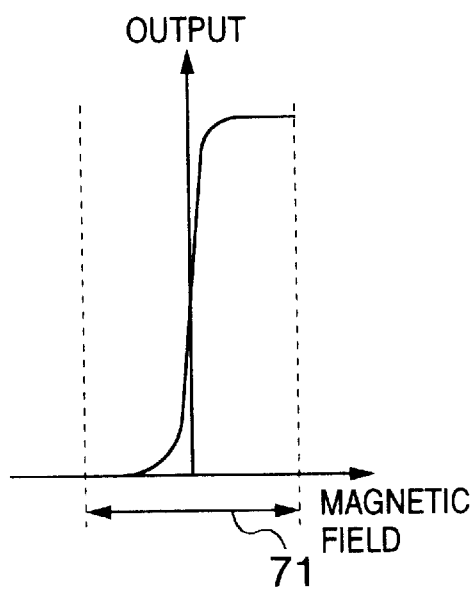
Figure 14C:
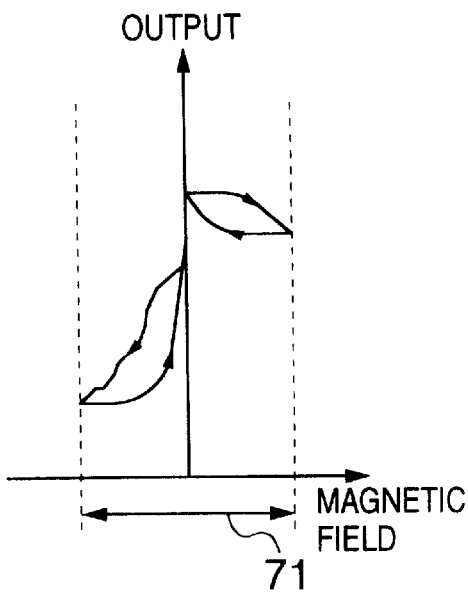
Figure 14D:
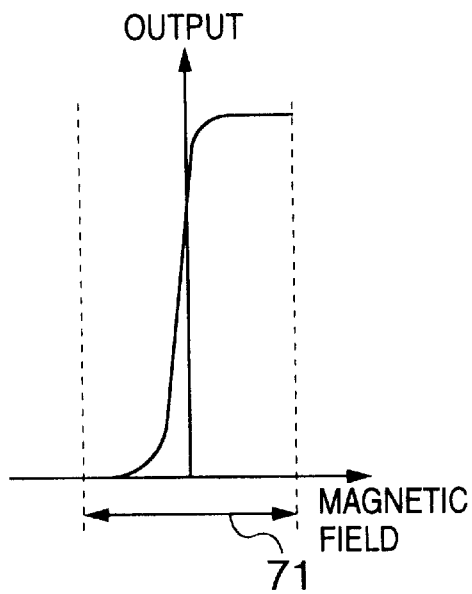

Next, the characteristic of the GMR element observed after it has been applied with a maximum magnetic field during a recording operation will be explained with reference to FIGS. 14A–14D. FIGS. 14A, 14B illustrate characteristic curves observed when a magnetic field 71, to be applied during a reproducing operation, is applied to the GMR element with a sufficiently fixed magnetization direction, the characteristic of which is illustrated in FIG. 13A, after maximum magnetic fields 721, 722 have been applied to the GMR element in the positive direction and in the negative direction, respectively. As can be seen, the GMR element with a sufficiently fixed magnetization direction does not exhibit any change between the characteristics illustrated in FIGS. 14A, 14B. This means that this GMR element has a stable characteristic which is not influenced by a recording operation. It should be noted, however, that such an element is not readily provided. This is because even a GMR element initially having a sufficiently fixed magnetization direction might undergo deterioration in the characteristic after a head fabrication process to lose the sufficiency of the fixed magnetization direction. FIGS. 14C, 14D illustrate characteristic curves observed when the magnetic field 71, to be applied during a reproducing operation, is applied to the GMR element with an insufficiently fixed magnetization direction, the characteristic of which is illustrated in FIG. 13B, after the maximum magnetic fields 721, 722 have been respectively applied to the GMR element in the positive direction and in the negative direction, respectively. As can be seen, the GMR element with an insufficiently fixed magnetization direction does exhibit a largely changed characteristic curve during the reproducing operation due to the direction of the magnetic field received thereby during a recording operation. After the recording magnetic field in the positive direction is applied to the GMR element, the characteristic of the GMR element is deteriorated to have a lower output level and hysteresis. Conversely, after the recording magnetic field is applied in the negative direction, a satisfactory characteristic is achieved similarly to the GMR element with a sufficiently fixed magnetization direction. It should be noted with respect to the direction of the recording magnetic field that the positive direction is opposite (antiparallel) to the magnetization direction 331 of the second ferromagnetic layer 33, and the negative direction is the same (parallel) as the magnetization direction 331.

Based on the above previous knowledge, the polarity of a current applied to the coil of the write element is fixed in one direction at the end of a recording operation in order to suppress fluctuations in read waveform before and after a recording operation. Particularly, in the configuration of this embodiment, the recording/reproducing operation control circuit 55 controls the recording current generating power supply 54 so as to terminate a recording operation always after a negative recording current is applied, so that a component of the magnetization direction of the second ferromagnetic layer in the GMR element perpendicular to the air bearing surface is in parallel with a component of a magnetic field generated by a recording current applied to the GMR element at the end of a recording operation, i.e., these two components have the same sign.

(Embodiment 6)

For designing a hard disk device having a GMR element to implement the stabilizing means for the GMR element, the recording/reproducing operation control circuit 55 may be provided with means for controlling the recording current generating power supply 54. In a stabilizing operation, the hard disk controller 66 controls the voice coil motor 63 to move the head 60 to the head recovering region 43, and the recording/reproducing operation control circuit 55 activates the means to control the recording current generating power supply 54 so as to fix in one direction the polarity of a recording current applied to the coil 22 constituting the write element 20 in the head 60 above the head recovering region 43 at the end of a recording operation. More specifically, assuming in terms of a winding direction of the coil 22 constituting the write element 20 that a positive magnetic field is generated (the upward direction relative to the GMR element 10, see FIG. 4) when a positive current is applied by the recording current generating power supply 54, the polarity of the recording current is determined such that a recording operation is terminated always after a negative recording current is applied. It should be noted that in this embodiment, since no information is to be recorded on a data track, the recording current may be a direct current. In this case, the polarity of the applied recording current is set to be always negative.

In the foregoing Embodiment 5, the polarity of the recording current is fixed in one direction at the end of a recording operation for recording information on a medium, so that a pattern of information to be recorded on a medium, i.e., a pattern of a recording current must be different from a conventional pattern. In contrast, since the stabilizing operation of Embodiment 6 is performed when an error is found in a reproducing operation, or on a periodic basis, or by an instruction of an operator or a host computer after the head is moved to the head recovering region, it is not necessary to employ an information pattern to be recorded on a medium, i.e., a pattern of a recording current different from a conventional pattern.

(Embodiment 7)

For designing a hard disk device having a GMR element to implement the stabilizing means for the GMR element, the recording/reproducing operation control circuit 55 may be provided with means for controlling the direction of the bias current 75 such that a magnetic field generated by a portion of the bias current 75 flowing through the first ferromagnetic layer 31 and applied to the second ferromagnetic layer 33 is in the same direction as the magnetization 331 of the second ferromagnetic layer 33 in a state where the GMR element 10 is applied with a leaking magnetic field 71 from a medium, i.e., in a state where the disk is rotated at a high speed with the head 60 positioned above the data track region 41 and held at a predetermined distance of several tens of nanometers from the surface of the disk.

The stabilizing operation of this embodiment will be described in detail in conjunction with the spin valve element illustrated in FIGS. 7A–7C. A direction of the average magnetization 331 of the second ferromagnetic layer 33 is fixed to point to the air bearing surface. Thus, the first ferromagnetic layer 31 is always applied with an upward magnetic field generated by the magnetization 331 of the second ferromagnetic layer 33. When the bias current 75 is applied in the left-hand direction, i.e., when a magnetic field generated by the bias current 75 and sensed by the first ferromagnetic layer 31 is in the downward direction, the best linear response is achieved. Therefore, a bias current of approximately 5 mA is applied in the left-hand direction during a reproducing operation. However, in this case, the direction of the magnetic field 74 generated by the bias current 75 and applied to the second ferromagnetic layer 33 is opposite to the direction of the magnetization 331 of the second ferromagnetic layer 33, i.e., in the upward direction.

As described above, a GMR element having a second ferromagnetic layer with an insufficiently fixed magnetization direction is susceptible to fluctuations in read waveform. In this case, a read waveform is recovered by once applying a magnetic field fixed in the downward direction, as described in conjunction with Embodiments 5, 6. Therefore, the direction of the bias current is determined to be in the right-hand direction, opposite to that during a reproducing operation, to apply the second ferromagnetic layer 33 with a downward magnetic field. This stabilizing operation also enables the recovery of a read waveform. While the second ferromagnetic layer 33 is also applied with a downward magnetic field generated by the bias current, another magnetic field generated by the magnetization 311 of the first ferromagnetic layer 31 turning upwardly and applied to the second ferromagnetic layer also contributes largely to the recovery of the read waveform. Thus, although a bias current larger than that applied during a reproducing operation is of course effective, a bias current equal to or even smaller than that applied during a reproducing operation may also produce similar effects.

(Embodiment 8)

For designing a hard disk device having a GMR element to implement the stabilizing means for the GMR element, the recording/reproducing operation control circuit 55 may be provided with means for controlling the direction of the bias current 75 such that a magnetic field 74 generated by a portion of the bias current 75 flowing through the first ferromagnetic layer 31 and applied to the second ferromagnetic layer 33 is in the same direction as the magnetization 331 of the second ferromagnetic layer 33 while a recording current is applied to the coil 22 constituting the write element 20 when information is recorded.

In Embodiment 8, since a recording magnetic field 73 is added to the magnetic field applied in Embodiment 7, a read waveform can be recovered with a lower bias current. In other words, while a bias current larger than that applied during a reproducing operation is of course effective in the recovery, a bias current equal to or even smaller than that applied during a reproducing operation may also produce similar effects. In addition, it is possible to limit the probability of fluctuations in read waveform to a low value by applying a larger bias current not only when a read waveform is recovered but also during every recording operation, or during periodic recording operations, or during a recording operation performed by an instruction from an operator or a host computer as is the case of Embodiment 2.

(Embodiment 9)

For designing a hard disk device having a GMR element to implement the stabilizing means for the GMR element, the recording/reproducing operation control circuit 55 may be provided with means for controlling the direction of the bias current 75. In a stabilizing operation, the hard disk controller 66 controls the voice coil motor 63 to move the head 60 to the head recovering region 43, and then the recording/reproducing operation control circuit 55 activates the means to control the direction of the bias current 75 such that a magnetic field 74 generated by a portion of the bias current 75 flowing through the first ferromagnetic layer 31 and applied to the second ferromagnetic layer 33 is in the same direction as the magnetization 331 of the second ferromagnetic layer 33, while a recording current is applied to the coil 22 constituting the write element 20 in the head 60 above the head recovering region 43.

When a reproducing operation is performed, correct positioning of a head may be prevented by an error in the reproducing operation. Also, for performing a recording operation, heads are first positioned. In this event, however, if a head cannot be appropriately positioned due to an error in a reproducing operation, the hard disk device is controlled not to perform a recording operation. In these cases, a head 60 is first moved to the head recovering region 43. It should be noted that in this event, since a head suffering from a trouble cannot be correctly positioned, another correct head is used to roughly position the troublesome head. After the troublesome head is positioned above the head recovering region 43, a direction-controlled bias current is applied while a recording operation is being performed. When the stabilizing operation of Embodiment 9 is performed, a read waveform can be effectively recovered in a manner similar to Embodiment 8. After the troublesome head is recovered to a normal state by the action of the stabilizing operation, the recovered head 60 is moved to the foregoing desired data track position for performing recording/reproducing operations. The stabilizing operation of Embodiment 9 may be performed on a periodic basis or by an instruction of an operator or a host computer.

(Embodiment 10)

For designing a hard disk device having a GMR element to implement the stabilizing means for the GMR element, the recording/reproducing operation control circuit 55 may be provided with means for controlling the recording current generating power supply 54 such that the magnetization of the second ferromagnetic layer is in the same direction as a recording magnetic field applied to the GMR element at the end of a recording operation, in addition to the means described in Embodiments 8, 9.

The employment of such a configuration enables a read waveform to be more stably recovered than Embodiments 8, 9. This is because the polarity of the current applied to the coil 22 of the write element at the end of a recording operation is fixed to a stabilized direction so that the direction of the magnetization 331 of the second ferromagnetic layer 33 can be more stably fixed.

(Embodiment 11)

Each of the foregoing hard disk devices having means for increasing the magnitude of a bias current may have means for controlling the bias current applying power supply 51 to increase the magnitude of the bias current larger than a predetermined magnitude of the bias current generally applied during a reproducing operation and smaller than five times the predetermined value.

The magnitude of the bias current should be so limited for the following reason. While a larger magnetic field is generated when a larger bias current is applied, an excessively large bias current would result in a large amount of heat generated from the read element and increased electromigration (a phenomenon in which a portion of a layer is damaged by application of a current over a long time), thus posing a problem in terms of reliability.

We claim:

1. A magnetic recording/reproducing device comprising:
    an inductive write element having a coil for generating flux and a pair of magnetic cores for collecting said flux for magnetically recording information on a medium;
    a magnetoresistive read element having a magnetoresistive layer and a pair of leads electrically connected to said magnetoresistive layer for transducing a change in a magnetic field leaking from a medium, on which information is recorded, into an electrical signal;
    means for applying a recording current to said coil of said write element;
    means for detecting an output signal of said read element;
    means for applying a bias field to said read element;
    recording/reproducing operation control means for reproducing information based on an output signal from said read element and for controlling said means for applying a recording current based on an inputted signal to record information; and
    stabilizing means for controlling said bias field applying means to apply a larger magnitude of bias field than a predetermined value used for a reproducing operation performed when said read element is applied with a magnetic field leaking from the medium.

2. A magnetic recording/reproducing device according to claim 1, wherein said bias field applying means applies a bias current to generate said bias field, and said output signal detecting means detects said bias current as said output signal.

3. A magnetic recording/reproducing device according to claim 1, wherein said bias field applying means applies a bias current to generate said bias field, and wherein said stabilizing means regulates the magnitude of said bias current to be equal to or more than 1.1 times a predetermined value of the bias current used for a reproducing operation, and equal to or less than five times the predetermined value.

4. A magnetic recording/reproducing device comprising:
    an inductive write element having a coil for generating flux and a pair of magnetic cores for collecting said flux for magnetically recording information on a medium;
    a magnetoresistive read element having a magnetoresistive layer and a pair of leads electrically connected to said magnetoresistive layer for transducing a change in a magnetic field leaking from a medium, on which information is recorded, into an electrical signal;
    means for applying a recording current to said coil of said write element;
    means for detecting an output signal of said read element;
    means for applying a bias current to said read element to generate a bias field;
    recording/reproducing operation control means for reproducing information based on an output signal from said read element and for controlling said means for applying a recording current based on an inputted signal to record information; and
    stabilizing means for controlling said bias current applying means to apply a larger magnitude of bias current than a predetermined value used for a reproducing operation performed when said read element is applied with a magnetic field leaking from the medium.

5. A magnetic recording/reproducing device according to claim 4, wherein said means for applying a bias current to said read element includes means for enabling the bias current to flow both in the same direction as and in the opposite direction as a predetermined direction of the bias current used in a reproducing operation.

6. A magnetic recording/reproducing device according to claim 4, wherein:
    said stabilizing means performs a sequence of operations at least once, said sequence of operations including:
    applying a larger magnitude of bias current than a predetermined value in the same direction as a predetermined direction of the bias current used in a reproducing operation, at the beginning of a stabilizing operation;
    determining whether or not an error has occurred; and
    applying a bias current in the direction opposite to said predetermined direction when an error is determined as a result of said determining step.

7. A magnetic recording/reproducing device according to claim 4, wherein said output signal detecting means detects said bias current as said output signal.

8. A magnetic recording/reproducing device according to claim 4, wherein said stabilizing means regulates the magnitude of said bias current to be equal to or more than 1.1 times a predetermined value of the bias current used for a reproducing operation, and equal to or less than five times the predetermined value.

9. A magnetic recording/reproducing device comprising:
    an inductive write element having a coil for generating flux and a pair of magnetic cores for collecting said flux for magnetically recording information on a medium;
    a magnetoresistive read element having a magnetoresistive layer and a pair of leads electrically connected to said magnetoresistive layer for transducing a change in a magnetic field leaking from a medium, on which information is recorded, into an electrical signal;

a read/write head including said inductive write element and said magnetoresistive read element;

means for applying a recording current to said coil of said write element;

means for detecting an output signal of said read element;

means for applying a bias current to said read element to generate a bias field;

recording/reproducing operation control means for reproducing information based on an output signal from said read element and for controlling said means for applying a recording current based on an inputted signal to record information; and stabilizing means for controlling said recording current applying means and said bias current applying means to apply a recording current to said coil and simultaneously apply a larger magnitude of bias current than a predetermined value used for a reproducing operations when information is recorded.

10. A magnetic recording/reproducing device according to claim 9, wherein said means for applying a bias current to said read element includes means for enabling the bias current to flow both in the same direction as and in the opposite direction as a predetermined direction of the bias current used in a reproducing operation.

11. A magnetic recording/reproducing device according to claim 9, wherein:

said stabilizing means performs a sequence of operations at least once, said sequence of operations including:

applying a larger magnitude of bias current than a predetermined value in the same direction as a predetermined direction of the bias current used in a reproducing operation, at the beginning of a stabilizing operation;

determining whether or not an error has occurred; and applying a bias current in the direction opposite to said predetermined direction when an error is determined as a result of said determining step.

12. A magnetic recording/reproducing device according to claim 9, wherein said output signal detecting means detects said bias current as said output signal.

13. A magnetic recording/reproducing device according to claim 9, wherein said stabilizing means regulates the magnitude of said bias current to be equal to or more than 1.1 times a predetermined value of the bias current used for a reproducing operation, and equal to or less than five times the predetermined value.

14. A magnetic recording/reproducing device comprising:

an inductive write element having a coil for generating flux and a pair of magnetic cores for collecting said flux for magnetically recording information on a medium;

a magnetoresistive read element having a magnetoresistive layer and a pair of leads electrically connected to said magnetoresistive layer for transducing a change in a magnetic field leaking from a medium, on which information is recorded, into an electrical signal;

a read/write head including said inductive write element and said magnetoresistive read element;

means for applying a recording current to said coil of said write element;

means for detecting an output signal of said read element;

means for applying a bias current to said read element to generate a bias field;

recording/reproducing operation control means for reproducing information based on an output signal from said read element and for controlling said means for applying a recording current based on an inputted signal to record information;

a positioning mechanism for determining a relative position of said read/write head with respect to a medium;

means for controlling said positioning mechanism;

means to allocate a head recovering region on the medium different from a data track region for storing information; and stabilizing means for controlling said positioning mechanism, said recording current applying means, and said bias current applying means to move said read/write head to said head recovering region, then apply a recording current to said coil, and simultaneously apply a larger magnitude of bias current than a predetermined value used for a reproducing operation.

15. A magnetic recording/reproducing device according to claim 14, wherein said means for applying a bias current to said read element includes means for enabling the bias current to flow both in the same direction as and in the opposite direction as a predetermined direction of the bias current used in a reproducing operation.

16. A magnetic recording/reproducing device according to claim 14, wherein:

said stabilizing means performs a sequence of operations at least once, said sequence of operations including:

applying a larger magnitude of bias current than a predetermined value in the same direction as a predetermined direction of the bias current used in a reproducing operation, at the beginning of a stabilizing operation;

determining whether or not an error has occurred; and applying a bias current in the direction opposite to said predetermined direction when an error is determined as a result of said determining step.

17. A magnetic recording/reproducing device according to claim 14, wherein said output signal detecting means detects said bias current as said output signal.

18. A magnetic recording/reproducing device according to claim 14, wherein said stabilizing means regulates the magnitude of said bias current to be equal to or more than 1.1 times a predetermined value of the bias current used for a reproducing operation, and equal to or less than five times the predetermined value.

19. A magnetic recording/reproducing device comprising:

an inductive write element having a coil for generating flux and a pair of magnetic cores for collecting said flux for magnetically recording information on a medium;

a magnetoresistive read element having a magnetoresistive layer and a pair of leads electrically connected to said magnetoresistive layer for transducing a change in a magnetic field leaking from a medium, on which information is recorded, into an electrical signal, wherein said magnetoresistive layer has a lamination structure including a first ferromagnetic layer, the magnetization direction of which changes by said magnetic field leaking from a medium on which information is recorded, a second ferromagnetic layer having a fixed magnetization direction, and a non-magnetic conductor layer between said first ferromagnetic layer and said second ferromagnetic layer, said magnetoresistive layer being a giant magnetoresistive layer whose resistance changes in response to a change in an angle between the magnetization direction of said first ferromagnetic layer and the magnetization direction of said second ferromagnetic layer;

a read/write head including said inductive write element and said magnetoresistive read element;

means for applying a recording current to said coil of said write element;

means for detecting an output signal of said read element;

recording/reproducing operation control means for reproducing information based on an output signal from said read element and for controlling said means for applying a recording current based on an inputted signal to record information; and stabilizing means for controlling said recording current applying means to fix the polarity of the recording current applied to said coil of said write element in one direction at the end of a recording operation.

20. A magnetic recording/reproducing device according to claim 19, wherein said stabilizing means includes means for controlling the polarity of the recording current at the end of said recording operation, such that a magnetic field component generated by said write element and applied to said read element, which magnetic field component is perpendicular to an air bearing surface of said read/write head, is in the same direction as a magnetization component of said second ferromagnetic layer, which magnetization component is perpendicular to the air bearing surface of said read/write head.

21. A magnetic recording/reproducing device comprising:

an inductive write element having a coil for generating flux and a pair of magnetic cores for collecting said flux for magnetically recording information on a medium;

a magnetoresistive read element having a magnetoresistive layer and a pair of leads electrically connected to said magnetoresistive layer for transducing a change in a magnetic field leaking from a medium, on which information is recorded, into an electrical signal, wherein said magnetoresistive layer has a lamination structure including a first ferromagnetic layer, the magnetization direction of which changes by said magnetic field leaking from a medium on which information is recorded, a second ferromagnetic layer having a fixed magnetization direction, and a nonmagnetic conductor layer between said first ferromagnetic layer and said second ferromagnetic layer, said magnetoresistive layer being a giant magnetoresistive layer whose resistance changes in response to a change in an angle between the magnetization direction of said first ferromagnetic layer and the magnetization direction of said second ferromagnetic layer;

a read/write head including said inductive write element and said magnetoresistive read element;

means for applying an AC or DC recording current to said coil of said write element;

means for detecting an output signal of said read element;

recording/reproducing operation control means for reproducing information based on an output signal from said read element and for controlling said means for applying a recording current based on an inputted signal to record information;

a positioning mechanism for determining a relative position of said read/write head with respect to a medium;

means for controlling said positioning mechanism;

means to allocate on the medium a head recovering region different from a data track region for storing information; and stabilizing means for controlling said positioning mechanism and said recording current applying means to move said read/write head to said head recovering region, and to fix the polarity of the recording current applied to said coil in one direction at the end of a recording operation, by fixedly setting the polarity of said recording current in one direction at the end of applying said recording current when the AC recording current is applied to said coil of said write element, and by fixedly setting the polarity of said recording current in one direction when the DC recording current is applied to said coil of said write element.

22. A magnetic recording/reproducing device according to claim wherein said stabilizing means includes means for controlling the polarity of the recording current at the end of said recording operation, when said read/write head remains above said head recovering region, such that a magnetic field component generated by said write element and applied to said read element, which magnetic field component is perpendicular to an air bearing surface of said read/write head, is in the same direction as a magnetization component of said second ferromagnetic layer, which magnetization component is perpendicular to the air bearing surface of said read/write head.

23. A magnetic recording/reproducing device comprising:

an inductive write element having a coil for generating flux and a pair of magnetic cores for collecting said flux for magnetically recording information on a medium;

a magnetoresistive read element having a magnetoresistive layer and a pair of leads electrically connected to said magnetoresistive layer for transducing a change in a magnetic field leaking from a medium, on which information is recorded, into an electrical signal, wherein said magnetoresistive layer has a lamination structure including a first ferromagnetic layer, the magnetization direction of which changes by said magnetic field leaking from a medium on which information is recorded, a second ferromagnetic layer having a fixed magnetization direction, and a nonmagnetic conductor layer between said first ferromagnetic layer and said second ferromagnetic layer, said magnetoresistive layer being a giant magnetoresistive layer whose resistance changes in response to a change in an angle between the magnetization direction of said first ferromagnetic layer and the magnetization direction of said second ferromagnetic layer;

means for applying a recording current to said coil of said write element;

means for detecting an output signal of said read element;

means for applying a bias current to said read element to generate a bias field;

recording/reproducing operation control means for reproducing information based on an output signal from said read element and for controlling said means for applying a recording current based on an inputted signal to record information; and stabilizing means for controlling a direction of said bias current such that a magnetic field generated by a portion of said bias current flowing through said first ferromagnetic layer and applied to said second ferromagnetic layer is in the same direction as the magnetization of said second ferromagnetic layer when said read element is applied with a magnetic field leaking from a medium.

24. A magnetic recording/reproducing device according to claim 23, wherein said stabilizing means includes means to apply a larger magnitude of bias current than a predetermined value used for a reproducing operation, during the stabilizing operation.

25. A magnetic recording/reproducing device according to claim 23, wherein said output signal detecting means detects said bias current as said output signal.

26. A magnetic recording/reproducing device according to claim 23, wherein said stabilizing means regulates the magnitude of said bias current to be equal to or more than 1.1 times a predetermined value of the bias current used for a reproducing operation, and equal to or less than five times the predetermined value.

27. A magnetic recording/reproducing device comprising:
an inductive write element having a coil for generating flux and a pair of magnetic cores for collecting said flux for magnetically recording information on a medium;
a magnetoresistive read element having a magnetoresistive layer and a pair of leads electrically connected to said magnetoresistive layer for transducing a change in a magnetic field leaking from a medium, on which information is recorded, into an electrical signal, wherein said magnetoresistive layer has a lamination structure including a first ferromagnetic layer, the magnetization direction of which changes by said magnetic field leaking from a medium on which information is recorded, a second ferromagnetic layer having a fixed magnetization direction, and a non-magnetic conductor layer between said first ferromagnetic layer and said second ferromagnetic layer, said magnetoresistive layer being a giant magnetoresistive layer whose resistance changes in response to a change in an angle between the magnetization direction of said first ferromagnetic layer and the magnetization direction of said second ferromagnetic layer;
a read/write head including said inductive write element and said magnetoresistive read element;
means for applying a recording current to said coil of said write element;
means for detecting an output signal of said read element;
means for applying a bias current to said read element to generate a bias field;
recording/reproducing operation control means for reproducing information based on an output signal from said read element and controlling said means for applying a recording current based on an inputted signal to record information; and
stabilizing means for controlling said recording current applying means and a direction of said bias current such that a magnetic field generated by a portion of said bias current flowing through said first ferromagnetic layer and applied to said second ferromagnetic layer is in the same direction as the magnetization of said second ferromagnetic layer when the recording current is applied to said coil for recording information.

28. A magnetic recording/reproducing device according to claim 27, wherein said stabilizing means includes means for controlling the polarity of the recording current at the end of said recording operation, such that a magnetic field component generated by said write element and applied to said read element, which magnetic field component is perpendicular to an air bearing surface of said read/write head, is in the same direction as a magnetization component of said second ferromagnetic layers which magnetization component is perpendicular to the air bearing surface of said read/write head.

29. A magnetic recording/reproducing device according to claim 27, wherein said stabilizing means includes means to apply a larger magnitude of bias current than a predetermined value used for a reproducing operation, during the stabilizing operation.

30. A magnetic recording/reproducing device according to claim 27, wherein said output signal detecting means detects said bias current as said output signal.

31. A magnetic recording/reproducing device according to claim 27, wherein said stabilizing means regulates the magnitude of said bias current to be equal to or more than 1.1 times a predetermined value of the bias current used for a reproducing operation, and equal to or less than five times the predetermined value.

32. A magnetic recording/reproducing device comprising:
an inductive write element having a coil for generating flux and a pair of magnetic cores for collecting said flux for magnetically recording information on a medium;
a magnetoresistive read element having a magnetoresistive layer and a pair of leads electrically connected to said magnetoresistive layer for transducing a change in a magnetic field leaking from a medium, on which information is recorded, into an electrical signal, wherein said magnetoresistive layer has a lamination structure including a first ferromagnetic layer, the magnetization direction of which changes by said magnetic field leaking from a medium on which information is recorded, a second ferromagnetic layer having a fixed magnetization direction, and a nonmagnetic conductor layer between said first ferromagnetic layer and said second ferromagnetic layer, said magnetoresistive layer being a giant magnetoresistive layer whose resistance changes in response to a change in an angle between the magnetization direction of said first ferromagnetic layer and the magnetization direction of said second ferromagnetic layer;
a read/write head including said inductive write element and said magnetoresistive read element;
means for applying a recording current to said coil of said write element;
means for detecting an output signal of said read element;
means for applying a bias current to said read element to generate a bias field;
recording/reproducing operation control means for reproducing information based on an output signal from said read element and for controlling said means for applying a recording current based on an inputted signal to record information;
a positioning mechanism for determining a relative position of said read/write head with respect to a medium;
means for controlling said positioning mechanism;
means to allocate on the medium a head recovering region different from a data track region for storing information; and
stabilizing means for controlling said positioning mechanism, said recording current applying means, and a direction of said bias current such that said read/write head moves to said head recovering region, and a magnetic field generated by a portion of said bias current flowing through said first ferromagnetic layer and applied to said second ferromagnetic layer is in the same direction as the magnetization of said second ferromagnetic layer when the recording current is applied to said coil.

33. A magnetic recording/reproducing device according to claim 32, wherein said stabilizing means includes means for controlling the polarity of the recording current such that a magnetic field component generated by said write element and applied to said read element, which magnetic field component is perpendicular to an air bearing surface of said read/write head, is in the same direction as a magnetization component of said second ferromagnetic layer, which magnetization component is perpendicular to the air bearing surface of said read/write head.

34. A magnetic recording/reproducing device according to claim 32, wherein said stabilizing means includes means to apply a larger magnitude of bias current than a predetermined value used for a reproducing operation, during the stabilizing operation.

35. A magnetic recording/reproducing device according to claim 32, wherein said output signal detecting means detects said bias current as said output signal.

36. A magnetic recording/reproducing device according to claim 32, wherein said stabilizing means regulates the magnitude of said bias current to be equal to or more than 1.1 times a predetermined value of the bias current used for a reproducing operation, and equal to or less than five times the predetermined value.

* * * * *